(12) United States Patent
Karaki

(10) Patent No.: US 8,253,456 B2
(45) Date of Patent: Aug. 28, 2012

(54) TIME CORRECTION CIRCUIT AND ELECTRONIC APPARATUS

(75) Inventor: Nobuo Karaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 95 days.

(21) Appl. No.: 12/870,312

(22) Filed: Aug. 27, 2010

(65) Prior Publication Data

US 2011/0050306 A1   Mar. 3, 2011

(30) Foreign Application Priority Data

Sep. 1, 2009   (JP) ................................ 2009-201626

(51) Int. Cl.
*H03L 7/06* (2006.01)
(52) U.S. Cl. ..... 327/156; 327/147; 327/158; 455/184.1; 455/226.3; 455/277.1
(58) Field of Classification Search ............... 455/184.1, 455/226.3, 277.1; 327/147, 156, 158
See application file for complete search history.

(56) References Cited

U.S. PATENT DOCUMENTS
2009/0258622 A1* 10/2009 Ruijter ....................... 455/226.3

FOREIGN PATENT DOCUMENTS
JP    A-2008-211352    9/2008
* cited by examiner

*Primary Examiner* — John Poos
(74) *Attorney, Agent, or Firm* — Oliff & Berridge, PLC

(57) ABSTRACT

A time correction circuit includes: a time-measurement device that measures a time period; a receiver device that receives electromagnetic wave based on a first baseband signal, the first baseband signal including time information concerning time and being encoded by a pulse width modulation method, and outputs a second baseband signal based on the electromagnetic wave received; and an asynchronous circuit that corrects the time based on the second baseband signal, wherein the asynchronous circuit executes a specified process to retrieve the time information from the second baseband signal based on the time period measured, at least one of when the second baseband signal changes from high level to low level and when the second baseband signal changes from low level to high level, and assumes a standby state after executing the specified process.

16 Claims, 13 Drawing Sheets

TIME CORRECTION CIRCUIT AND ELECTRONIC APPARATUS

The entire disclosure of Japanese Patent Application No. 2009-201626, filed Sep. 1, 2009 is expressly incorporated by reference herein.

BACKGROUND

1. Technical Field

The present invention relates to a time correction circuit that corrects the time based on, for example, electromagnetic waves received from outside of the circuit, and an electronic apparatus having the time correction circuit.

2. Related Art

A radio-controlled timepiece equipped with this kind of time correction circuit is generally known to be equipped with a radio-controlled timepiece reception module having a CPU that reads time information based on an electric signal received, an oscillator that outputs a clock pulse of 32 kHz, a frequency divider circuit that frequency-divides the clock pulse to output a time-measurement pulse of 1 Hz, and a real time clock having a time-measurement counter that counts up each of the bits when a predetermined number of time-measurement pulses are inputted. As the time information read by the radio-controlled timepiece reception module is reflected on the time-measurement counter of the real time clock, the radio-controlled timepiece can automatically correct the time thereon to the correct time received from outside (see, for example, Japanese Laid-open Patent Application 2008-211352).

The radio-controlled timepiece reception module of related art is a synchronous circuit that is controlled by the CPU. As each of the circuit blocks in the synchronous circuit is driven by the clock signal, the radio-controlled timepiece reception module is driven by a global clock that is a reference clock signal for the entire circuit in order to synchronize the circuit blocks. On the other hand, when a CPU with a low processing power is used in order to reduce the cost of the radio-controlled timepiece reception module, the frequency of the global clock is increased to increase the operation speed of the CPU, whereby the amount of processing per unit time is increased.

However, the current consumption in each of the circuit blocks increases in proportion to an increase in the frequency of the clock signal, which causes a problem in that, when the frequency of the global clock is increased in order to increase the operation speed of the CPU, the power consumption in circuits other than the CPU also increases. Also, there is another problem in that the clock signal generates increased noise due to electromagnetic radiation when its frequency is increased.

SUMMARY

In accordance with an advantage of some aspects of the invention, it is possible to provide a time correction circuit that can reduce its power consumption and noise while its cost can be reduced, as well as an electronic apparatus using the time correction circuit.

A time correction circuit in accordance with an embodiment of the invention includes a time-measurement device that measures the time; a receiver device that receives electromagnetic wave based on a first baseband signal, the first baseband signal including time information concerning the time and being encoded by a pulse width modulation method, and outputs a second baseband signal based on the electromagnetic wave received; and an asynchronous circuit that corrects the time based on the second baseband signal, wherein the asynchronous circuit executes a specified process to retrieve the time information from the second baseband signal based on the time measured, at least one of when the second baseband signal changes from high level to low level and when the second baseband signal changes from low level to high level, and assumes a standby state after executing the specified process.

According to the configuration described above, the asynchronous circuit executes the specified process, at least one of when the second baseband signal changes from high level to low level and when the second baseband signal changes from low level to high level, and shifts to a standby state after executing the specified process. As the second baseband signal outputted from the receiver device is encoded by a pulse width modulation method, the time information can be retrieved from the second baseband signal based on the pulse widths of pulses included in the second baseband signal. The pulse width can be obtained based on the time period measured by the time-measurement device at a leading edge and at a trailing edge of the pulse, in other words, when the second baseband signal changes from high level to low level and from low level to high level. Accordingly, by executing the specified process by the asynchronous circuit at least one of when the second baseband signal changes from high level to low level and when it changes from low level to high level, the time information can be retrieved from the second baseband signal based on the measured time period, and the time can be corrected based on the retrieved time information.

Also, the asynchronous circuit is driven by an event in which the second baseband signal outputted from the receiver device changes from high level to low level and by an event in which it changes from low level to high level, whereby the reception and the asynchronous circuit can be operated without synchronizing with each other. Furthermore, the asynchronous circuit can calculate the pulse width from a difference between the time periods read out from the time-measurement device when these two events occurred, whereby the time-measurement device and the asynchronous circuit can be operated without synchronizing with each other. Therefore, the time-measurement device, the receiver device and the asynchronous circuit can be operated without synchronizing with one another, in other words, can be asynchronously operated with one another, such that the time correction circuit can be operated without requiring a global clock. Accordingly, an increased operation speed of the asynchronous circuit would not affect the current consumption of circuits other than the asynchronous circuit, and the power consumption of circuits other than the asynchronous circuit can be reduced, compared to the case where a global clock is used.

Furthermore, the asynchronous circuit, when placed in a standby state, would not flow dynamic currents other than leak currents, and has a short response time (latency) until another process becomes executable, and can quickly start up from the standby state. Therefore, at least one of when the second baseband signal changes from high level to low level and when it changes from low level to high level, the asynchronous circuit in the standby state can quickly start up and execute the specified process. Moreover, as the asynchronous circuit is placed in a standby state immediately after executing the specified process, it is possible to reduce currents other than those flowing in the period of executing the specified process, the current consumption by the asynchronous circuit can be reduced, and noise can be reduced as electromagnetic radiation is suppressed.

Preferably, the time correction circuit may be equipped with an oscillation circuit that generates a signal with a specified frequency, wherein the time-measurement device is a counter of specified bits that cyclically counts numerical values from zero to a set value based on the signal with the specified frequency, and the asynchronous circuit may execute the specified process based on the numerical values counted by the counter of specified bits.

According to the configuration described above, the time-measurement device is a counter of specified bits that cyclically counts numerical values from zero to a set value based on the signal with a specified frequency, and the asynchronous circuit executes the specified process based on the numerical values counted by the counter of specified bits. The counter of specified bits counts based on the signal with a specified frequency, such that the times that are integer multiples of the frequency of the signal generated by the oscillation circuit can be measured with a circuit with a simple structure. This makes it possible to reduce the power consumption by the time-measurement device.

Also, as the counter of specified bits cyclically counts numerical values from zero to a set value, it becomes free-running after starting the counting. On the other hand, the asynchronous circuit can calculate the pulse width based on a difference between numerical values readout from the counter of specified bits when these two events occur, such that the counter of specified bits and the asynchronous circuit can be operated without synchronizing with each other. Therefore, the counter of specified bits, the receiver device and the asynchronous circuit can be operated without being mutually synchronized in other words, can be operated asynchronously with one another, such that the time correction circuit having such a structure as recited above can be operated without requiring a global clock.

Preferably, the two's complement number of a predetermined numerical value may be set as the set value in the counter of specified bits.

According to this structure, the two's complement number of a predetermined numerical value is set as the set value in the counter of specified bits. Here, if a predetermined numerical value is set as is as the set value at the counter of specified bits, and is counted up, a comparator is required to judge as to whether the counted numerical value reaches the set value, and to reset the counted value when counting in the state in which the set value has been reached. In contrast, when the two's complement number of a predetermined numerical value is set as the set value at the counter of specified bits and counted up, the set value can be reset by using a carry signal that is outputted from the counter of specified bits when the specified numerical value is counted up, which makes a comparator unnecessary. Therefore, by setting the two's complement number of a predetermined numerical value as the set value in the counter of specified bits, the power consumption that would have been required for a comparator can be reduced.

Preferably, the specified frequency may be $2^n$ (n is a positive integer) Hz, and the specified bits may be (n+1) bits.

According to this structure, the frequency of the signal generated by the oscillation circuit may be $2^n$ Hz, and the time-measurement device may be a (n+1)-bit counter. Accordingly, the (n+1)-bit counter can measure the time from $1/2^n$ or above to less than $2^{n+1}/2^n$, in other words, less than 2 seconds.

Preferably, the specified frequency may be $2^{15}$ Hz, and the specified bits may be 16 bits.

According to this configuration, the frequency of the signal generated by the oscillation circuit may be $2^{15}$ Hz, and the time-measurement device is a 16-bit counter. Accordingly, the 16-bit counter can measure the time from $1/2^{15}$ seconds or above to less than $2^{16}/2^{15}$ seconds, in other words, less than 2 seconds.

Preferably, the time-measurement device may have an 8-bit prescaler that outputs a signal whose frequency is $1/2^m$ (m is an integer of 1 or more but 8 or less) of the frequency of the signal inputted from the oscillation circuit, and an 8-bit counter that cyclically counts numerical values from zero to a set value based on the signal inputted from the 8-bit prescaler, wherein the asynchronous circuit executes the specified process based on numerical values counted by the 8-bit counter.

According to the structure described above, the time-measurement device has the 8-bit prescaler that outputs a signal whose frequency is $1/2^m$ of the frequency of the signal inputted from the oscillation circuit, and the 8-bit counter that cyclically counts numerical values from zero to a set value based on the signal inputted from the 8-bit prescaler, wherein the asynchronous circuit executes the specified process based on numerical values counted by the 8-bit counter. Here, the 8-bit prescaler frequency-divides the specified frequency of the signal inputted from the oscillation circuit, i.e., $2^{15}$ Hz, to $1/2^m$, and the 8-bit counter counts based on the signal that has been frequency-divided to $1/2^m$, such that the time from $1/2^{14}$ seconds or above to less than 2 seconds can be measured with a simple structure. Therefore the power consumption by the time-measurement device can be reduced.

Also, as the 8-bit counter cyclically counts numerical values from zero to a set value, it becomes free-running after starting the counting. On the other hand, the asynchronous circuit can calculate the pulse width from a difference between numerical values readout from the 8-bit counter when these two events occur, such that the 8-bit counter and the asynchronous circuit can be operated without synchronizing with each other. Therefore, the 8-bit counter, the receiver device and the asynchronous circuit can be operated without mutual synchronization, in other words, can be operated asynchronously with one another, such that the time correction circuit having such a structure as described above can be operated without requiring a global clock.

Preferably, the two's complement number of a specified numerical value may be set as the set value at the 8-bit counter.

According to this structure, the two's complement number of a specified numerical value is set as the set value at the 8-bit counter. Here, if a predetermined numerical value is set as is as the set value at the 8-bit counter, and is counted up, a comparator would be required to judge as to whether the counted numerical value reaches the set value, and to reset the counted value when counting in the state in which the set value has been reached. In contrast, when the two's complement number of a predetermined numerical value is set as the set value at the 8-bit counter and counted up, the set value can be reset by using a carry signal that is outputted from the 8-bit counter upon counting up the specified numerical value, which makes a comparator unnecessary. Therefore, by setting the two's complement number of a predetermined numerical value as the set value at the 8-bit counter, the power consumption that would have been required for a comparator can be reduced.

Preferably, the specified process may include a conversion step of converting a pulse included in the second baseband signal into a specified symbol based on the time measured by the time-measurement device.

According to such a configuration, the specified process may include the conversion step of converting pulses included in the second baseband signal into specified symbols based on the time period measured by the time-measurement device. Accordingly, based on the time period measured by the time-measurement device, the pulses included in the second baseband signal outputted from the receiver device is converted to specified symbols, for example, symbols composing time information, such that the time information can be retrieved from the second baseband signal.

The conversion step may preferably include a detection step of detecting a leading pulse among the entire pulses included in a unit length of the second baseband signal based on the converted specified symbol.

According to such a configuration, the conversion step includes a detection step of detecting a leading pulse among the entire pulses included in a unit length of the second baseband signal based on the converted specified symbol. It is noted that the second baseband signal is continuously outputted from the receiver device, such that the second baseband signal in a unit length (one record) needs to be divided (discriminated) at its boundary, in other words, between the last one of the pulses in one preceding unit length and the first one of the pulses in the next unit length. Therefore, in related art, the entire symbols converted from pulses included in the second baseband signal in a unit length need to be stored for a plurality of records, and a boundary in the second baseband signal in a unit length is detected based on the stored symbols. In this case, the memory for storing the symbols needs a memory capacity for storing the entire symbols converted from the multiple records, for example, x×60 symbols (where x is an integer of 2 or more). In contrast, when pulses included in the second baseband signal are converted into specified symbols, and a boundary of the second baseband signal in a unit length is detected based on the converted specified symbols, the memory only requires a memory capacity for storing symbols converted from the second baseband signal for one record, for example, only 60 symbols. Therefore, as the conversion step includes the detection step of detecting a leading pulse among the entire pulses included in a unit length of the second baseband signal based on the converted specified symbol, such that a boundary of the second baseband signal in a unit length can be detected, and the memory capacity of the memory can be reduced. Therefore, the circuit cost and power consumption for the memory can be reduced in proportion to the reduced amount in the memory capacity.

The specified process may preferably include, before the conversion step, a judging step of judging based on the time period measured as to whether a shift in phase of a pulse is within a specified time range.

According to such a configuration, the specified process includes, before the conversion step, the judging step of judging based on the time period measured as to whether phase shifts in pulses are each within a specified time range. It is noted that a shift in the time axis direction, in other words, jitter, may be generated due to influences of noise or the like in the second baseband signal outputted from the receiver device. Therefore, the period and pulse width of a pulse included in the second baseband signal may have temporal shift. In other words, it is possible that a phase shift may be generated in at least one of the leading edge and the rear edge of a pulse included in the second baseband signal. In particular, as the phase of the leading edge of a pulse is used as a reference point for calculating (detecting) the pulse width of the pulse based on the time measured by the time-measurement device, a phase shift in the leading edge of a pulse has a great impact on the conversion step. Therefore, before the conversion step of converting a pulse included in the second baseband signal to a specified symbol, the judging step of judging, based on the time period measured by the time-measurement device, as to whether a phase shift in a pulse is within a specified time range is conducted, whereby the conversion step can be executed after confirming that the phase shift in the pulse included in the second baseband signal is within the time range permissible in the conversion step, and therefore the accuracy in converting a pulse into a specified symbol in the conversion step can be improved.

Preferably, the conversion step may be executed when it is judged in the judging step that phase shifts in a plurality of consecutive pulses are all within the specified time range.

According to such a configuration, the conversion step is executed when it is judged in the judging step that phase shifts in a plurality of consecutive pulses are all within the specified time range. It is noted that, when a plurality of consecutive pulses included in the second baseband signal outputted from the receiver device contain phase shifts that are all within a time range permissible in the conversion step, the state of electromagnetic wave reception is assumed to be stable. Therefore, by executing the conversion step when it is judged by the judging step that phase shifts in a plurality of consecutive pulses included in the second baseband signal outputted from the receiver device are all within the specified time range, the accuracy in converting pulses into specified symbols in the conversion step can be further improved.

Preferably, when all pulses included in the second baseband signal in a unit length are converted into specified symbols by the conversion step, the asynchronous circuit may execute a time correction process of retrieving time information from the entire specified symbols converted and correcting the time based on the retrieved time information. By this, when all pulses included in the second baseband signal in a unit length are converted into specified symbols by the conversion step, time information is retrieved from the entire specified symbols and the time is corrected. Therefore, if any one of the entire pulses included in the second baseband signal in a unit length cannot be converted into a specified symbol, the time is not corrected based on the second baseband signal. Accordingly, the reliability of the corrected time can be improved.

An electronic apparatus in accordance with an embodiment of the invention is equipped with the time correction circuit described above.

According to the structure described above, because the electronic apparatus in accordance with the present embodiment is equipped with the time correction circuit in accordance with the embodiment described above, the power consumption can be reduced, and electromagnetic radiation is suppressed and thus noise is reduced, compared to electronic apparatuses in related art. As a result, an electronic apparatus that has an extended operating hour with lower power consumption, and is highly reliable due to lower noise can be provided.

DESCRIPTION OF EXEMPLARY EMBODIMENTS

Embodiments of the invention are described below with reference to the accompanying drawings.

Time Correction Circuit

First Embodiment

Figure 1:
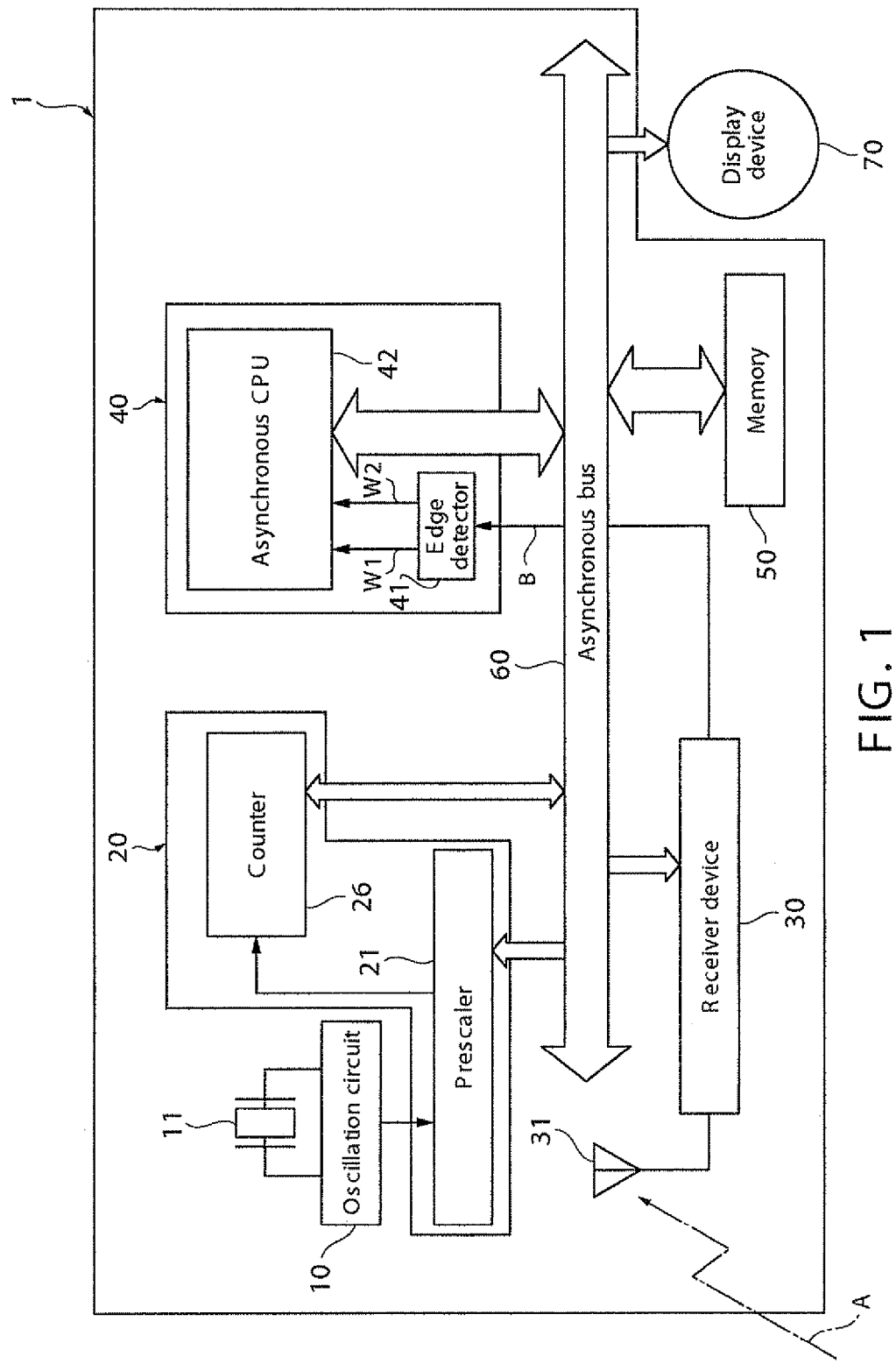
FIG. 1 is a block diagram showing the structure of a time correction circuit in accordance with a first embodiment of the invention.

FIGS. 1-10 show a time correction circuit in accordance with an embodiment of the invention. FIG. 1 is a block diagram of the structure of the time correction circuit in accordance with the first embodiment of the invention.

As shown in FIG. 1, the time correction circuit 1 corrects the time based on electromagnetic wave A received from outside of the circuit, and is equipped with an oscillation circuit 10, a timer 20, a receiver device 30, an asynchronous circuit 40 and a memory 50. The oscillation circuit 10 is connected to the timer 20, and the timer 20, the receiver device 30, the asynchronous circuit 40 and the memory 50 are connected through an asynchronous bus 60 in a manner that data and control signals can be communicated (transmitted and received) with one another. Also, an external display device 70 is also connected to the asynchronous bus 60, and the time correction circuit 1 displays the time based on the electromagnetic wave A received from outside on the display device 70, thereby correcting the time.

The oscillation circuit 10 is provided to oscillate a periodic signal with a specified frequency f. The oscillation circuit 10 has an oscillator 11 such as a crystal oscillator, and sustains oscillation to generate the signal with the specified frequency f when a voltage is applied to the oscillator 11. The signal with the specified frequency f oscillated by the oscillation circuit 10 is outputted from the oscillation circuit 10 to the timer 20. In accordance with the present embodiment, a pulse signal is outputted as the periodical signal oscillated by the oscillation circuit 10.

The timer 20 is provided for measuring the time period (i.e., a time-measurement device), and operates based on the signal with the specified frequency f inputted from the oscillation circuit 10. In other words, the signal with the specified frequency f inputted from the oscillation circuit 10 is used as a clock signal to drive the timer 20. In accordance with the present embodiment, the timer 20 is structured with a prescaler 21 and a counter 26, as an example of the time-measurement device.

The prescaler 21 is disposed in a preceding stage to the counter 26, and outputs a signal whose frequency is 1/m of the frequency of the inputted signal to the counter 26. In other words, the prescaler 21 is a counter that functions as a frequency divider with a division ratio m. The division ratio in is a numerical value that is pre-set through the asynchronous bus 60 by an asynchronous CPU 42 to be described below.

The counter 26 cyclically counts numerical values from zero to a predetermined set value C based on the signal inputted from the prescaler 21. For example, the counter 26 is structured to count up (measures) one count at each one cycle (one pulse) of the signal inputted from the prescaler 21, and to be reset to zero upon counting in a state where the numerical value counted up from zero reaches the specified set value C. The specified set value C is a numerical value that has been pre-set through the asynchronous bus 60 by the asynchronous CPU 42.

In the example described above, the counter 26 counts up numerical values from zero to the specified set value C. However, without any particular limitation to the above, it may be structured to count down numerical values from the set value C to zero. In this case, the counter 26 is reset to the set value C upon counting in a state in which the numerical value counted down reaches zero.

Also, the counter 26 is not limited to the structure to start counting from zero. As long as the counter 26 cyclically counts numerical values from zero to the specified set value C, the counter 26 may start counting from, for example, a numerical value between zero and the set value C.

The timer 20 thus structured can measure the time up to the time for T seconds that is expressed by Formula (1) below.

$$T = m \times C / f \qquad (1)$$

When the oscillation circuit 10 oscillates a pulse signal with a frequency of $2^{15}$ Hz, in other words, 32768 Hz, as the signal with the specified frequency f, the timer 20 uses an 8-bit prescaler 21 and an 8-bit counter 26. In this case, the 8-bit prescaler 21 can be set with an integer value between 1 and 255 as the set value C, and the 8-bit counter 26 can be set with an integer value between 1 and 255 as the set value C. By this, according to Formula (1), the timer 20 can measure the time T from $1/2^{15}$ seconds or above to the time less than $2^{16}/2^{15}$ seconds, in other words, less than 2 seconds ($1/2^{15} \leq T < 2$).

When a numerical value of a power of two is set as the division ratio m, an 8-bit (stage) prescaler 21 with a division ratio $2^k$ (k is an integer between 1 and 8) may preferably be used. By this, the frequency division can be performed by the circuit with a simple structure, and the power consumption by the timer 20 can be reduced.

Figure 2:
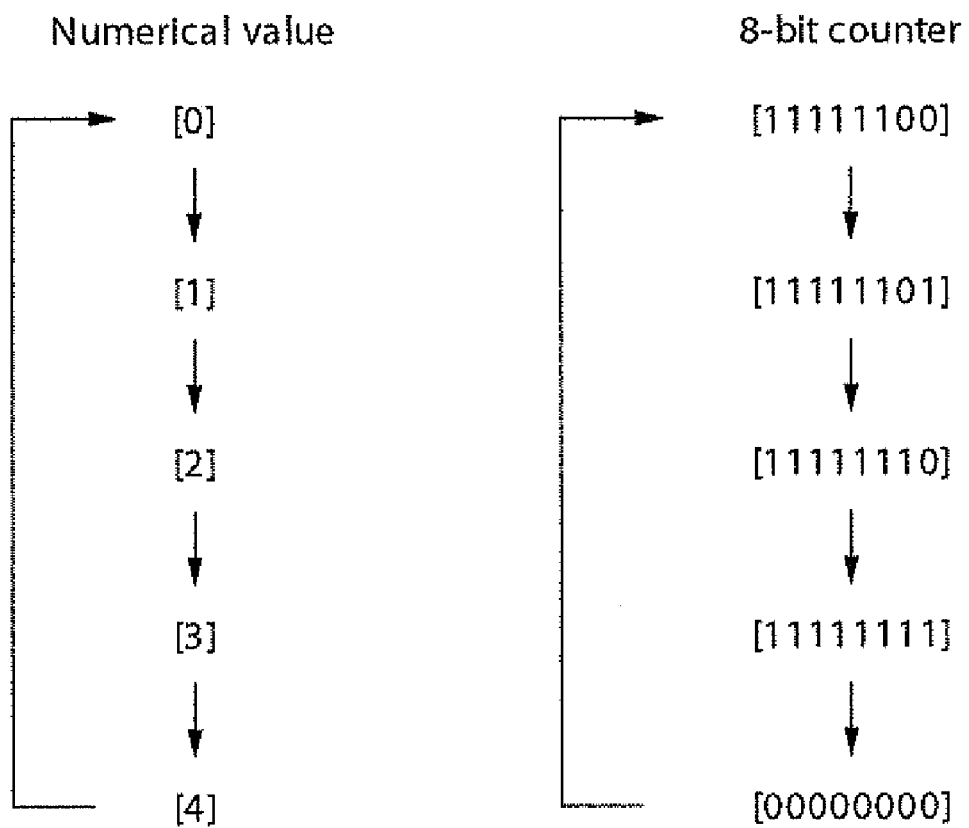
FIG. 2 is a diagram for describing set values to be set at a counter shown in FIG. 1.

FIG. 2 is a diagram for explaining the set value to be set at the counter shown in FIG. 1. As the set value C to be set at the 8-bit counter 26, the asynchronous CPU 42 may preferably be set the two's complement of a specified numerical value. As shown in FIG. 2, for example, when the 8-bit counter 26 cyclically counts up one count by one count from zero to four, the two's complement of "4" that is a desired numerical value, i.e., "11111100" is set as the set value C, and these digits are set at the respective bits of the 8-bit counter 26. Then, when counting up from zero to four, i.e., "0"→"1"→"2"→"3"→"4," the 8-bit counter 26 changes the value, as "11111100"→"11111101"→"11111110"→"11111111"→"000000000." In other words, upon counting "4," an overflow (a carry signal) is generated in the 8-bit counter 26, and the entire bits turn to zeros. Thereafter, the 8-bit counter 26 is reset, and the two's complement number of "4" is set at the bits again. Here, if a predetermined numerical value is set as is as the set value at the 8-bit counter 26, and counted up, a comparator would be required to judge as to whether the counted numerical value reaches the set value C, and to reset the counted value when counting in the state in which the set value C has been reached. In contrast, when the two's complement number of a predetermined numerical value is set as the set value C at the 8-bit counter 26 and counted up, the set value C can be reset by using a carry signal that is outputted from the 8-bit counter when the specified numerical value is counted up, which makes a comparator unnecessary.

The receiver device 30 shown in FIG. 1 is a device (a receiver device) that receives electromagnetic wave A based on a baseband signal b (first baseband signal) to be described below, and outputs a baseband signal B (second baseband signal) based on the received electromagnetic wave A. The electromagnetic wave A modulates the baseband signal b with a carrier wave of a predetermined frequency, for example, 40 kHz, 60 kHz or the like by an amplitude modulation (AM) method for transmitting the same. The receiver device 30 has an antenna 31 for receiving the electromagnetic wave A transmitted from an external transmitting station, performs amplification and amplitude demodulation of the electromagnetic wave A received by the antenna 31, and outputs the baseband signal B through the asynchronous bus 60 to the asynchronous circuit 40.

Figure 3:
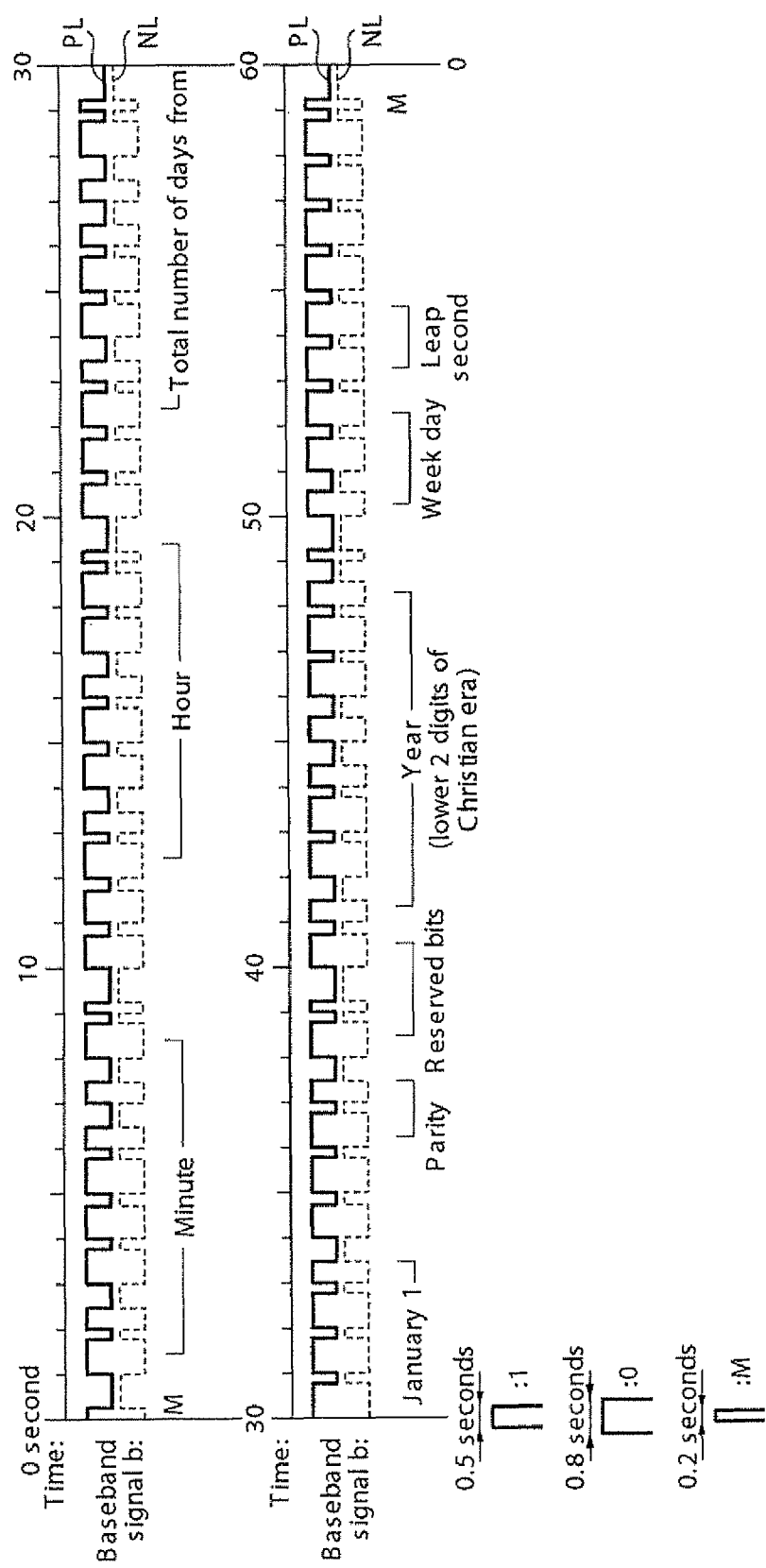
FIG. 3 is a data structure diagram for explaining an example of a baseband signal transmitted on electromagnetic wave shown in FIG. 1.

FIG. 3 is a data structure diagram for describing an example of the baseband signal that is transmitted by the electromagnetic wave shown in FIG. 1. FIG. 3 indicates the baseband signal b expressed in positive logic as PL, and that in negative logic as NL. The baseband signal b is generated by, for example, a wireless station outside of the time correction circuit 1, and transmitted with the electromagnetic wave A. As shown in FIG. 3, the baseband signal b is composed of pulses having specified pulse widths generated at a cycle of one second. In other words, the baseband signal b encodes the pulse width of each of the pulses in the generated pulse signal by a pulse width modulation (PWM) method (hereafter referred to as PWM encoding), thereby correlating them to, for example, three symbols of "1," "0" and "M" (marker), respectively. It is noted that, in the invention, the symbols may mean codes, marks or signs. In accordance with the present embodiment, specified symbols ("1," "0" and "M") are correlated to codes, in other words, pulses whose pulse widths are modulated by PWM encoding. As shown in FIG. 3, for example, the symbol "1" corresponds (is equivalent) to a code that expresses a pulse with a pulse width of 0.5 seconds, the symbol "0" corresponds to a code that expresses a pulse with a pulse width of 0.8 seconds, and the symbol "M" corresponds to a code that expresses a pulse with a pulse width of 0.2 seconds. The baseband signal b includes time information relating to the time, and is a signal whose unit length (record) is one minute, in other words, 60 pulses. For example, 8 pulses from the second pulse to the ninth pulse (from 1 second to 9 seconds) provide information concerning "minutes" and 8 pulses from the thirteenth pulse to the twentieth pulse (from 12 seconds to 20 seconds) provide information concerning "hours." Also the baseband signal b includes pulses with the symbol "M" at the first pulse (from 0 second to 1 second) and at the sixtieth pulse (from 59 seconds to 60 seconds).

It may be sufficient if the baseband signal b includes time information, and the baseband signal b may also include other information for "year," "week day" and the like, and information for detecting errors such as parity and the like. Also, the present embodiment uses the system in which only information about "hour" and "minute" are included as the time information, and "second" are fixed as "00" second, but "second" information may also be included as the time information, without being limited to the above.

The asynchronous circuit 40 corrects the time based on the baseband signal B outputted from the receiver device 30. The asynchronous circuit 40 is structured with a edge detector 41 and an asynchronous CPU 42.

It the present specification, the baseband signal outputted from the receiver device 30 is called, in particular, the baseband signal B (second baseband signal) in order to be distinguished from the original baseband signal b (first baseband signal). Also, the baseband signal b and the baseband signal B are described as being expressed in negative logic. Therefore, the signal level of the baseband signal b and the baseband signal B changes from high level to low level at the leading edge section (the falling edge) of each of the pulses, and changes from low level to high level at the rear edge section (the rising edge) of each of the pulses.

The edge detector 41 judges as to whether the level of the inputted signal changes from high level to low level, or changes from low level to high level. The baseband signal B is inputted in the edge detector 41 through the asynchronous bus 60 from the receiver device 30. The edge detector 41 outputs a fall interrupt signal W1 to the asynchronous CPU 42, when the baseband signal B changes from high level to low level, in other words, when leading edges of the pulses are detected. The edge detector 41 outputs a rise interrupt signal W2 to the asynchronous CPU 42, when the baseband signal B changes from low level to high level, in other words, when rear edges of the pulses are detected.

The asynchronous CPU 42 is a core unit of the asynchronous circuit 40, and executes specified processings to decode the baseband signal B into the time information based on the time period measured by the timer 20. The asynchronous CPU 42 reads the numerical value of the counter 26 through the asynchronous bus 60, thereby obtaining the time period measured by the timer 20. Also, the asynchronous CPU 42 executes specified processings to be described below, thereby outputting the time information retrieved from the baseband signal B to the external display device 70 through the asynchronous bus 60 and correcting the time to accurate time based on the baseband signal B.

The memory 50 stores programs and data to be used by the asynchronous CPU 42. The memory 50 is accessed (read/written) by the asynchronous CPU 42 through the asynchronous bus 60.

It is noted that, the term "synchronous circuit" as used in the present specification refers to a circuit designed for the purpose of performing circuit operations based on a global clock for central control of the circuit. On the other hand, the "asynchronous circuit" refers to a circuit designed so that minimal functional circuits (processes) perform distributed controls independently or dependently from, and locally cooperating with one another without using a global clock. In the asynchronous circuit, the minimal functional circuits are controlled in an event-driven fashion, and operate only when it is determined as necessary to operate independently, or when it is determined as necessary to operate dependently. In other words, each of the minimal functional circuits is capable of operating in parallel with and independently from the other minimal functional circuits, and does not need to wait for the other minimal functional circuits to complete their processing in order for itself to start processing. A minimal functional circuit can start processing whenever it is prepared to execute a desired processing.

The asynchronous circuit does not need a global clock, and circuit current flows therein only when the operation changes, whereby the power consumption can be reduced. Also, as the power consumption is low, components for a power supply can be made considerably smaller, and the number of components for the oscillation circuit can be reduced as no clock signal is needed. Also, the power supply section and other components can be made smaller in size or unnecessary, leading to lower costs. As the characteristics of an asynchronous circuit, measures against second harmonic waves are not necessary, clock skew does not logically exist, and high-speed implementation to the maximum is possible, even when an element whose device characteristic largely varies and operation speed is relatively low, such as a thin film element, is used or large wire delay exists.

Also, in accordance with the present embodiment, the timer 20 described above is included in the synchronous circuit, and the asynchronous circuit 40 (the asynchronous CPU 42) described above is included in the asynchronous circuit. Also the asynchronous circuit is not limited to the case where the entire circuit blocks included in the circuit are structured to be asynchronous, but also includes cases where a part of the circuit blocks is structured with an asynchronous circuit. For example, a synchronous circuit block that is driven by a specific clock signal is connected to the asynchronous circuit block through the asynchronous bus corresponds to an asynchronous circuit as a whole, as they do not use a global clock. Therefore, the time correction circuit 1 in accordance with the present embodiment is included in the asynchronous circuit.

Figure 4:
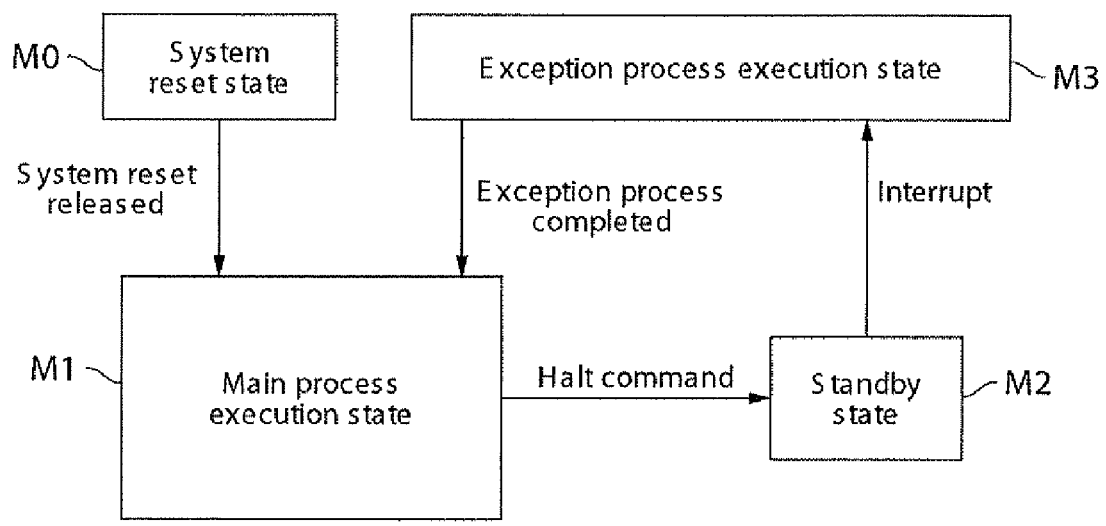
FIG. 4 is a state transition diagram of an asynchronous CPU shown in FIG. 1.

FIG. 4 is a state transition diagram of the asynchronous CPU shown in FIG. 1. As shown in FIG. 4, the asynchronous CPU 42 changes to four states, i.e., a system reset state M0, a main process execution state M1, a waiting state (a standby state) M2, and an exception process execution state M3. More specifically, when a system reset signal is inputted, the asynchronous CPU 42 changes its state from the main process execution state M1, the standby state M2, or the exception process execution state M3 to the system reset state M0. The asynchronous CPU 42 in the system reset state M0 shifts to the main process execution state M1 when the system reset signal is released. It is noted that the system reset signal is normally released without synchronizing with (irrespective of) the timing of pulses included in the baseband signal B.

In the main process execution state M1, the asynchronous CPU 42 executes a main process S100 to be described below. When a halt command is executed in the main process S100, the asynchronous CPU 42 shifts to the standby state M2. The asynchronous CPU 42 in the standby state M2 waits (halts) until an interrupt signal is inputted. When a fall interrupt signal W1 or a rise interrupt signal W2 is inputted from the edge detector 41, the asynchronous CPU 42 shifts to the exception process execution state M3. In the exception process execution state M3, the asynchronous CPU 42 executes a specified process to retrieve time information from the baseband signal B based on the time period measured by the timer 20.

As the baseband signal B outputted from the receiver device 30 is encoded by the pulse width modulation method (PWM encoded), the baseband signal B can be decoded based on the pulse widths of pulses included in the baseband signal B. The pulse width can be obtained based on the leading edge and the rear edge of each pulse, in other words, based on the times measured by the timer 20 when the baseband signal B changes from high level to low level and changes from low level to high level. Accordingly, at least one of when the baseband signal B changes from high level to low level and when the baseband signal B changes from low level to high level, in other words, in the exception process execution state M3, the asynchronous CPU 42 executes the specified process to retrieve time information from the baseband signal B based on the time period measured by the timer 20, whereby the time information can be retrieved from the baseband signal B and the time can be corrected based on the retrieved time information.

As the asynchronous CPU 42 is driven by the event in which the baseband signal B changes from high level to low level and by the event in which it changes from low level to high level, the receiver device 30 and the asynchronous CPU 42 can be operated without mutual synchronization. Further, the asynchronous CPU 42 can calculate the pulse width from a difference between the time periods read from the timer 20 at the time of occurrence of these two events, such that the timer 20 and the asynchronous CPU 42 can be operated without mutual synchronization. By this, the timer 20, the receiver device 30 and the asynchronous CPU 42 are operable without mutual synchronization, in other words, can be operated asynchronously with one another, such that the time correction circuit 1 can be operated without requiring a global clock.

Here, the 8-bit prescaler 21 frequency-divides the specified frequency of the signal inputted from the oscillation circuit 10, i.e., $2^{15}$ Hz, to $1/2^m$ (m is an integer between 1 and 8), and the 8-bit counter 26 counts based on the signal that has been frequency-divided to $1/2^m$, such that the timer 20 can measure the time from $1/2^{14}$ seconds or above to less than 2 seconds with a relatively simple circuit structure.

Also, as the 8-bit counter cyclically counts numerical values from zero to a set value, it becomes free-running after starting the counting. On the other hand, the asynchronous CPU 42 can calculate the pulse width from a difference between numerical values readout from the counter 26 when these two events occurred, such that the 8-bit counter and the asynchronous CPU 42 can be operated without synchronizing with each other. Therefore, the 8-bit counter, the receiver device 30 and the asynchronous CPU 42 can be operated without mutual synchronization, in other words, can be operated asynchronously with one another, such that the time correction circuit 1 having such a structure as described above can be operated without requiring a global clock.

Furthermore, the asynchronous CPU 42, when placed in the standby state M2, would not flow dynamic currents other than leak currents, and has a small waiting time (latency) until another process becomes executable, and can quickly start up from the standby state M2.

The specified process described above includes a conversion step of converting pulses included in the baseband signal B into specified symbols according to the pulse widths, based on the time period measured by the timer 20. By this, based on the time period measured by the timer 20, pulses included in the baseband signal B are converted into specified symbols ("M," "1" and "0") composing the time information.

The conversion step includes a detection step of detecting the leading pulse among the entire pulses included in a unit length of the baseband signal B based on the converted specified symbols.

It is noted that the baseband signal B is continuously outputted from the receiver device 30, such that the baseband signal B in a unit length (one record) needs to be separated (discriminated) at its boundary, in other words, between the pulse appended with the last symbol in one preceding unit length and the pulse appended with the leading symbol in the next unit length. Therefore, in related art, the entire symbols converted from pulses included in the baseband signal in a unit length are stored for a plurality of records, and a boundary in the baseband signal B in the unit length is detected based on the stored symbols. In this case, the memory for storing the symbols needs a memory capacity for storing the entire symbols converted from the multiple records, for example, x×60 symbols (where x is an integer of 2 or more). In contrast, when pulses included in the baseband signal B are converted into specified symbols, and a boundary of the baseband signal B in a unit length is detected based on the converted specified symbols, the memory only requires a memory capacity for storing symbols converted from the baseband signal B for one record, for example, only 60 symbols. Therefore, the conversion step preferably includes the detection step of detecting a leading pulse among the entire pulses included in a unit length of the baseband signal B, based on the converted specified symbols.

The specified process includes, before the conversion step, a judging step of judging as to whether shifts in phase of pulses included in the baseband signal B are each within a specified time range, based on the time period measured by the timer 20.

Figure 5:
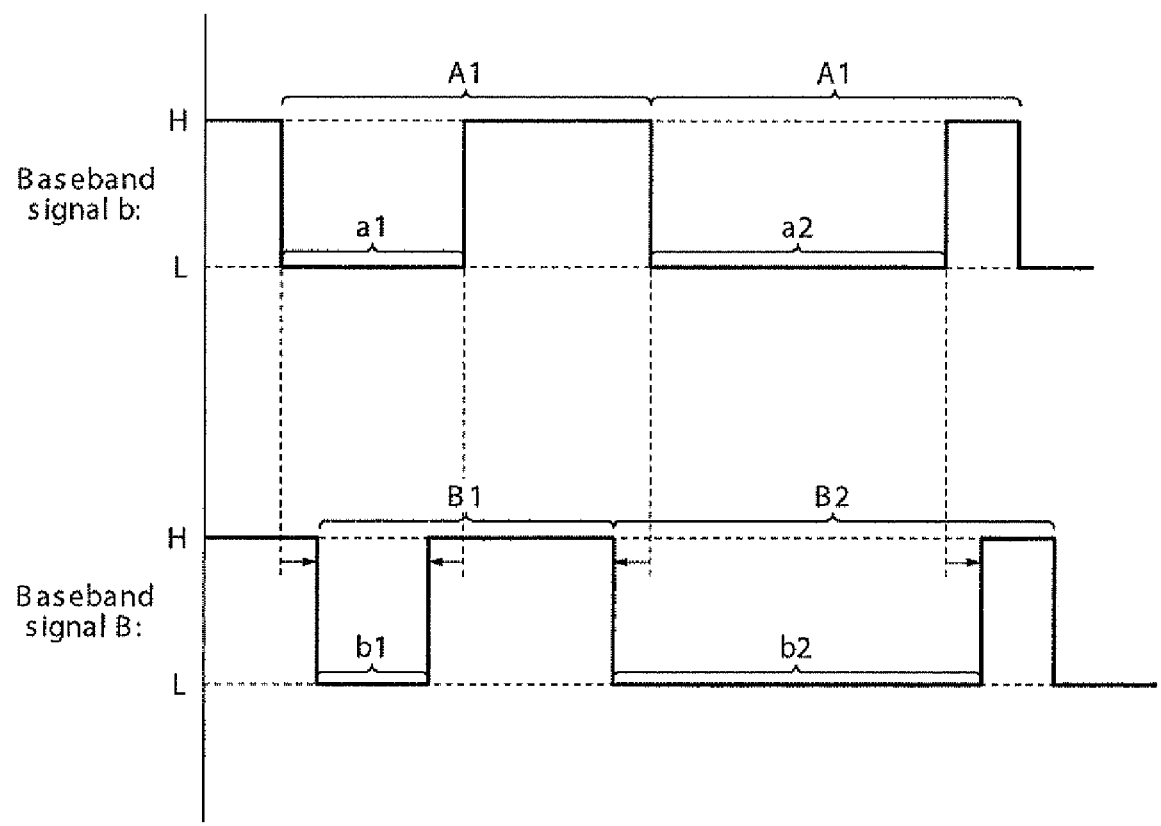
FIG. 5 is a diagram for explaining a baseband signal outputted from a receiver device shown in FIG. 1.

FIG. 5 is a diagram for describing the baseband signal outputted from the receiver device shown in FIG. 1. FIG. 5 indicates "H" when the level of the signal is at high level and "L" when the level of the signal is at low level. It is noted that a shift in the time axis direction, in other words, jitter, could occur in the baseband signal B due to influence of noise or the like in the electromagnetic transmission path. In other words, it is possible that at least one of the leading edge and the rear edge of a pulse included in the second baseband signal may have a phase shift. For this reason, it is possible that temporal shifts occur in the periods and pulse widths of pulses included in the baseband signal B. As shown in FIG. 5, for example, leading edges or rear edges of pulses included in the baseband signal B may delay or advance with respect to the corresponding pulses included in the baseband signal b due to jitter (as indicated by arrows in FIG. 5). As a result, the pulse widths and the periods of the pulses included in the baseband signal B may differ from the pulse widths and the periods of the pulses included in the baseband signal b (b1<a1, b2>a2, B1<A1<B2). In other words, phase shifts may occur in at least one of the leading edges and the rear edges of the pulses included in the baseband signal B. In this case, when the pulses included in the baseband signal B are converted into specified symbols by the conversion step, there is a possibility that they may not be converted into correct symbols. In particular, as the phase of the leading edge of a pulse is used as a reference point for calculating (detecting) the pulse width of the pulse based on the time period measured by the timer 20, the phase of the leading edge of a pulse has a great impact on the conversion step. Therefore, before the conversion step, the specified process preferably includes the judging step of judging, based on the time period measured by the timer 20, as to whether shifts in phase of pulses included in the baseband signal B are each within a specified time range.

In accordance with the present embodiment, the asynchronous CPU 42 in the exception process execution state M3 executes, as the specified process, a falling edge process S200 or a rising edge process S300 to be described below according to the kinds of interrupt signals.

As shown in FIG. 4, when the falling edge process S200 or the rising edge process S300 is completed, the asynchronous CPU 42 shifts into the main process execution state M1. In the main process execution state M1, the asynchronous CPU 42 restarts the processes following the halt command described above in the main process S100.

Figure 6:
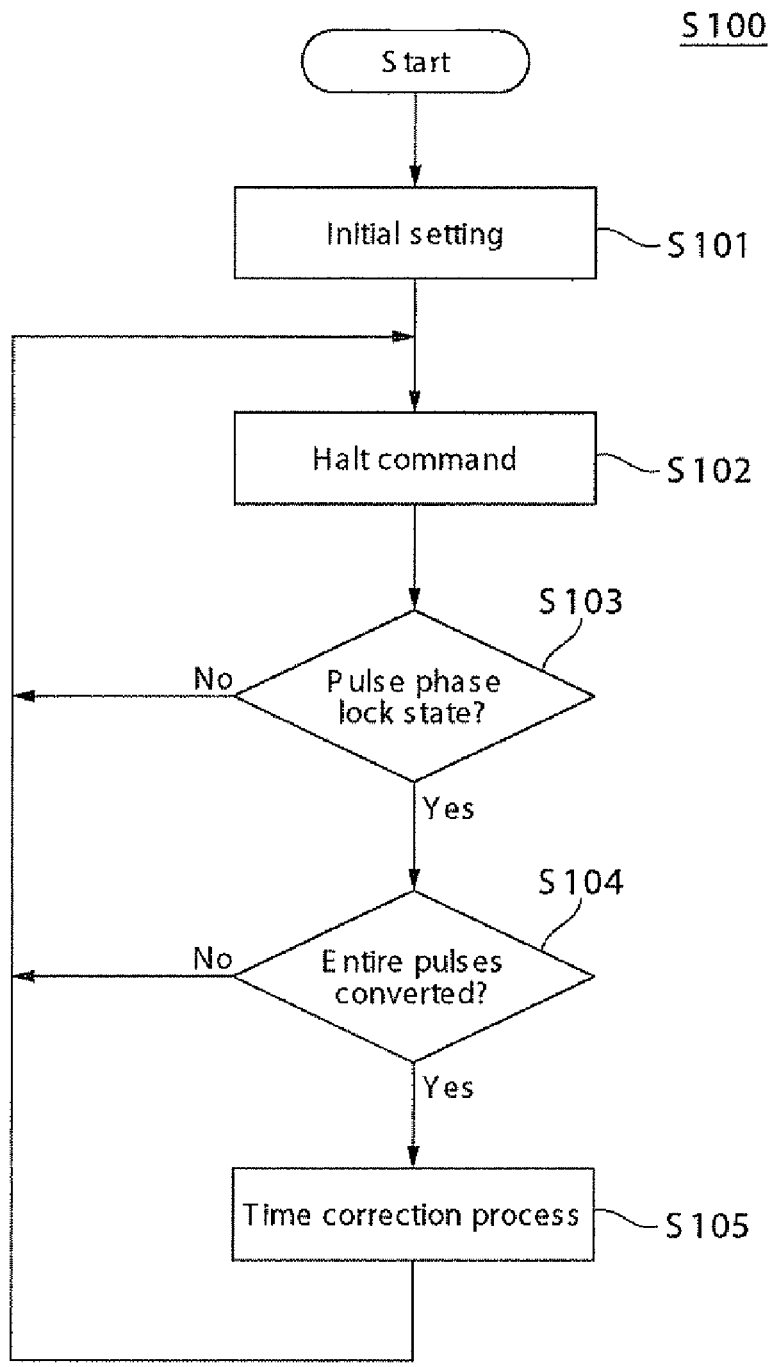
FIG. 6 is a flow chart of the main process that is executed in a main process execution state shown in FIG. 4.

FIG. 6 is a flow chart of the main process S100 executed in the main process execution state shown in FIG. 4. As shown in FIG. 6, as the system reset signal is released and the main process S100 is started, the asynchronous CPU 42 initially performs an initial setting (S101). In the initial setting, the asynchronous CPU 42, for example, sets a division ratio m at the prescaler 21, sets a set value C at the counter 26, drives the timer 20 to start the time period measurement, and initializes variables and flags to be used in the program.

Next, the asynchronous CPU 42 executes the halt command (S102), and shifts to the standby state M2 shown in FIG. 4.

Then, when the falling edge process S200 or the rising edge process S300 is completed in the exception process execution state M3 shown in FIG. 4, and the process shifts again to the main process execution state M1, the asynchronous CPU 42 performs the step following the halt command in step S102, in other words, judges as to whether the phase of the pulse included in the baseband signal B is in a phase lock state or not (whether or not in a pulse phase lock state) (S103). When the phase of the pulse included in the baseband signal B is not in a phase lock state, the asynchronous CPU 42 executes the halt command in step S102 again, and repeats steps S102-S103 until the phase of the pulse included in the baseband signal B turns to the phase lock state.

When it is judged as a result of the judgment in step S103 that the phase of the pulse included in the baseband signal B is in the phase lock state, then it is judged as to whether the entire pulses included in the unit length of the baseband signal B have been converted to specified symbols (whether the entire pulses have been converted or not) (S104). When the entire pulses included in the unit length of the baseband signal B have not been converted to specified symbols, the asynchronous CPU 42 executes the halt command in step S102 again, and repeats steps S102-S104 until the entire pulses included in the unit length of the baseband signal B are converted into specified symbols.

When it is judged as a result of the judgment in step S104 that the entire pulses included in the unit length of the baseband signal B have been converted to specified symbols (when the entire pulses have been converted), the asynchronous CPU 42 executes a time correction process S105. More specifically, the asynchronous CPU 42 retrieves time information from the entire specified symbols that have been converted in the conversion step described above, and outputs the retrieved time information to the display device 70 to correct the time (S105). By this, when the entire pulses included in a unit length of the baseband signal B have been converted to specified symbols by the conversion step described above, time information is retrieved from the entire specified symbols and the time is corrected. Therefore, when any one of the entire pulses included in the unit length of the baseband signal B could not be converted into a specified symbol, the time is not corrected based on the baseband signal B.

After step S105, the asynchronous CPU 42 repeats steps S102-S105 again until the system reset signal is inputted and the process shifts to the system reset state M0.

Figure 7:
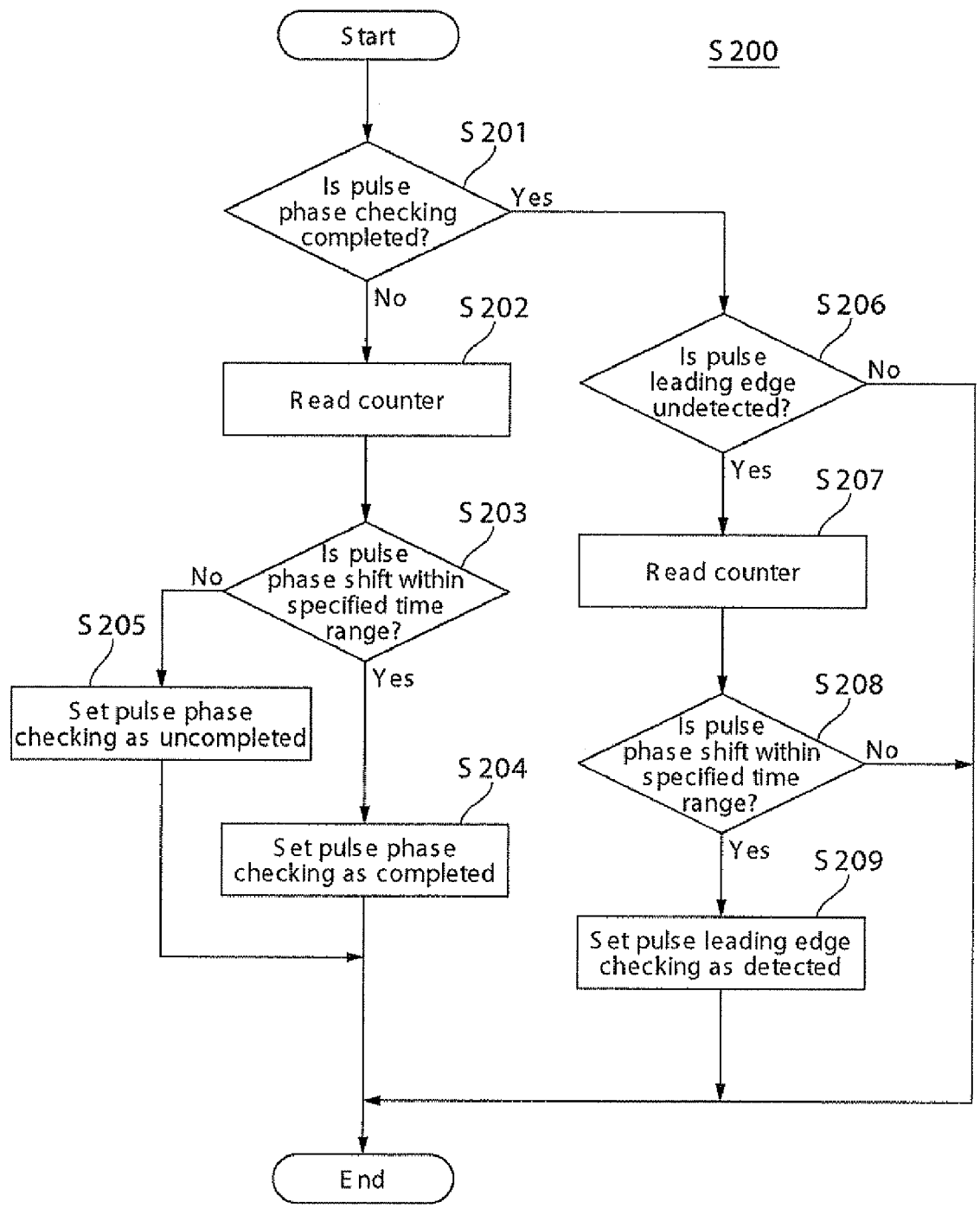
FIG. 7 is a flow chart of a falling edge process that is executed in an exception process execution state shown in FIG. 4.

FIG. 7 is a flow chart of the falling edge process to be executed in the exception process execution state shown in FIG. 4. As shown in FIG. 7, when a fall interrupt signal W1 is inputted from the edge detector 41 and the falling edge process S200 is started, the asynchronous CPU 42 judges as to whether checking of the phase of the pulse included in the baseband signal B has been completed or not (whether the pulse phase check has been completed or not) (S201).

When it is judged as a result of judgment in step S201 that checking of the phase of the pulse included in the baseband signal B has not been completed, the asynchronous CPU 42 executes the judgment step described above. More specifically, the asynchronous CPU 42 reads the numerical value of the counter 26 (S202), and judges, based on the numerical value read, as to whether or not the shift in phase of the pulse included in the baseband signal B is within the specified time range (S203).

When it is judged as a result of the judgment in step S203 that the shift in phase of the pulse included in the baseband signal B is within the specified time range, the asynchronous CPU 42 sets the phase checking of the pulse included in the baseband signal B as completed (S204). At this moment, the phase of the pulse included in the baseband signal B is placed in phase lock state. On the other hand, when the phase shift in the pulse included in the baseband signal B is not within the specified time range, the asynchronous CPU 42 sets the phase checking of the pulse included in the baseband signal B as uncompleted (or leaves it as uncompleted) (S205).

On the other hand, when it is judged as a result of the judgment in step S201 that the phase checking of the pulse included in the baseband signal B has been completed, the asynchronous CPU 42 judges as to whether the leading edge of the pulse on which the conversion step is to be executed has been undetected (whether or not the pulse leading edge has not been detected) (S206).

When it is determined as a result of the judgment in step S206 that the leading edge of the pulse on which the conversion step is to be executed has been undetected, the asynchronous CPU 42 reads the numerical value of the counter 26 (S207), and judges based on the numerical value read as to whether the phase shift in the pulse included in the baseband signal B is within the specified time range (S208).

When it is judged as a result of the judgment in step S208 that the phase shift in the pulse included in the baseband signal B is within the specified time range, detection of the leading edge of the pulse on which the conversion step is to be executed is set as being completed (S209).

On the other hand, when it is judged as a result of the judgment in step S206 that the leading edge of the pulse on which the conversion step is to be executed is not undetected, in other words, has been detected, and when it is judged as a result of the judgment in step S208 that the phase shift of the pulse included in the baseband signal B is not within the specified time range, the asynchronous CPU 42 completes the falling edge process S200 without doing anything (without setting the leading edge of the pulse on which the conversion step is to be executed as having been detected).

Figure 8:
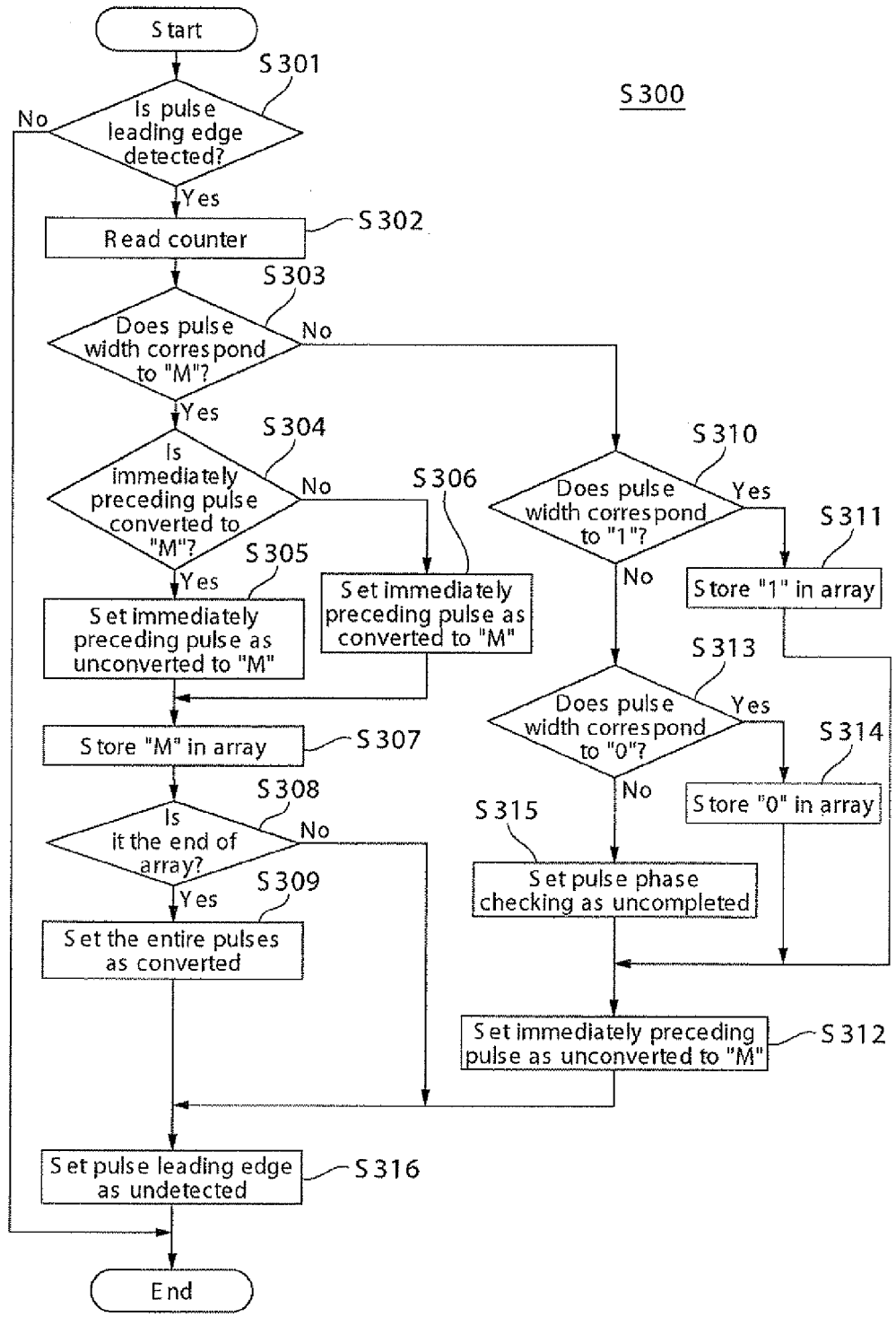
FIG. 8 is a flow chart of a rising edge process that is executed in the exception process execution state shown in FIG. 4.

FIG. 8 is a flow chart of the rising edge process to be executed in the exception process execution state shown in FIG. 4. As shown in FIG. 8, when the rising edge process S300 is started as a rise interrupt signal W2 is inputted from the edge detector 41, the asynchronous CPU 42 judges as to whether or not the leading edge of the pulse on which the conversion step is to be executed has been detected (S301).

When it is judged in step S301 that the leading edge of the pulse on which the conversion step is to be executed has been detected, the asynchronous CPU 42 executes the conversion step described above. More specifically, the asynchronous CPU 42 reads the numerical value of the counter 26 (S302), and judges based on the read numerical value as to whether the pulse width of the pulse included in the baseband signal B is 0.2 seconds, in other words, has a length corresponding to the symbol "M" (whether the pulse width corresponds to "M" or not) (S303).

When it is judged in step S303 that the pulse width of the pulse included in the baseband signal B corresponds to the symbol "M," the asynchronous CPU 42 executes the detection step described above. More specifically, the asynchronous CPU 42 judges as to whether the immediately preceding pulse has been converted to the symbol "M" (whether conversion of the immediately preceding pulse to "M" has been completed or not) (S304). It is noted here that, as shown in FIG. 3, pulses corresponding to the symbol "M" in the baseband signal b successively appear only at the sixtieth pulse in a unit length of the baseband signal b (from 59 seconds to 60 seconds) and at the first pulse in the next unit length of the baseband signal b (from 0 second to 1 second). Therefore, when the immediately preceding pulse and the current pulse correspond to the symbol "M," in other words, when the pulses corresponding to the symbol "M" successively occur, this means that the first pulse (the leading pulse) in the unit length of the baseband signal B is detected.

When it is judged in step S304 that the immediately preceding pulse has been converted to the symbol "M," the asynchronous CPU 42 sets the pointer of an array storing the converted symbols to its head, and resets, in other words, sets the immediately preceding pulse as being unconverted to the symbol "M" in order to detect the first pulse (the leading pulse) in the next unit length of the baseband signal B (S305). It is noted that the array storing the converted symbols is stored in the memory 50. On the other hand, when the immediately preceding pulse has not been converted to the symbol "M," the asynchronous CPU 42 sets the immediately preceding pulse as being converted to the symbol "M" in order to make the judgment in step S304 at the following pulse (S306).

After step S305 or step S306, the asynchronous CPU 42 stores the symbol "M" in the array and, after storing the symbol, adds 1 to the pointer of the array (S307). By this, the current pulse is converted to the symbol "M."

Next, the asynchronous CPU 42 judges as to whether the pointer of the array reaches the end (whether it is at the end of the array or not) (S308). When the pointer of the array reaches the end, the asynchronous CPU 42 sets the pointer to the head, and sets the entire pulses as being converted (S309). When the pointer of the array has not reached the end, the asynchronous CPU 42 does nothing (does not perform step S309).

On the other hand, when it is judged in step S303 that the pulse width of the pulse included in the baseband signal B does not have the length corresponding to the symbol "M," the asynchronous CPU 42 judges, based on the numerical value read from the counter 26 in step S302, as to whether the pulse width of the pulse included in the baseband signal B is 0.5 seconds, in other words, has the length corresponding to the symbol "1" (whether the pulse width corresponds to "1" or not) (S310).

When it is judged in step S310 that the pulse width of the pulse included in the baseband signal B has the length corresponding to the symbol "1," the asynchronous CPU 42 stores the symbol "1" in the array and, after storing, adds 1 to the pointer of the array (S311). By this, the present pulse is converted to the symbol "1."

Also, the asynchronous CPU 42 sets the immediately preceding pulse as being unconverted to the symbol "M" in order to perform the judgment in step S304 at the next pulse (S312).

On the other hand, when it is judged in step S310 that the pulse width of the pulse included in the baseband signal B does not have the length corresponding to the symbol "1," the asynchronous CPU 42 judges, based on the numerical value read from the counter 26 in step S302, as to whether the pulse width of the pulse included in the baseband signal B is 0.8 seconds, in other words, has the length corresponding to the symbol "0" (whether the pulse width corresponds to "0" or not) (S313).

When it is judged in step S313 that the pulse width of the pulse included in the baseband signal B has the length corresponding to the symbol "0," the asynchronous CPU 42 stores the symbol "0" in the array and, after storing, adds 1 to the pointer of the array (S314). By this, the present pulse is converted to the symbol "0."

Also, after step S314, the asynchronous CPU 42 executes step S312 in order to make the judgment in step S304 at the next pulse.

On the other hand, when it is judged in step S313 that the pulse width of the pulse included in the baseband signal B does not have the length corresponding to the symbol "0," in other words, the pulse width does not correspond to the symbol "M," the symbol "1" or the symbol "0," it is assumed that the pulse width has been changed by influence of jitter. Therefore, the asynchronous CPU 42 sets the phase checking of the pulse included in the baseband signal B as uncompleted (S315), in order to execute the judging step again by the judgment step in S201 at the next pulse. At this time, when the phase of the pulse included in the baseband signal B is in phase lock state, the phase lock state is released (the phase lock state is removed).

It is noted that, in step S315, the asynchronous CPU 42 can change the division ratio m and the set value C, and changes the configuration of the receiver device 30, such as, for example, changing the transmission station, the reception frequency, and other settings.

Also, after step S315, the asynchronous CPU 42 executes step S312, in order to make a judgment in step S304 at the next pulse.

After step S309, when it is judged in step S308 that the pointer of the array has not reached the end, and after step S312, the asynchronous CPU 42 sets the leading edge of the pulse on which the conversion step is to be executed as being undetected (S316) in order to make a judgment in step S206 at the next pulse, and ends the rising edge process S300.

On the other hand, when it is judged in step S301 that detection of the leading edge of the pulse on which the conversion step is to be executed has not been completed, in other words, the leading edge of the pulse on which the conversion step is to be executed has not been detected, the asynchronous CPU 42 ends the rising edge process S300 without doing anything.

Figure 9:
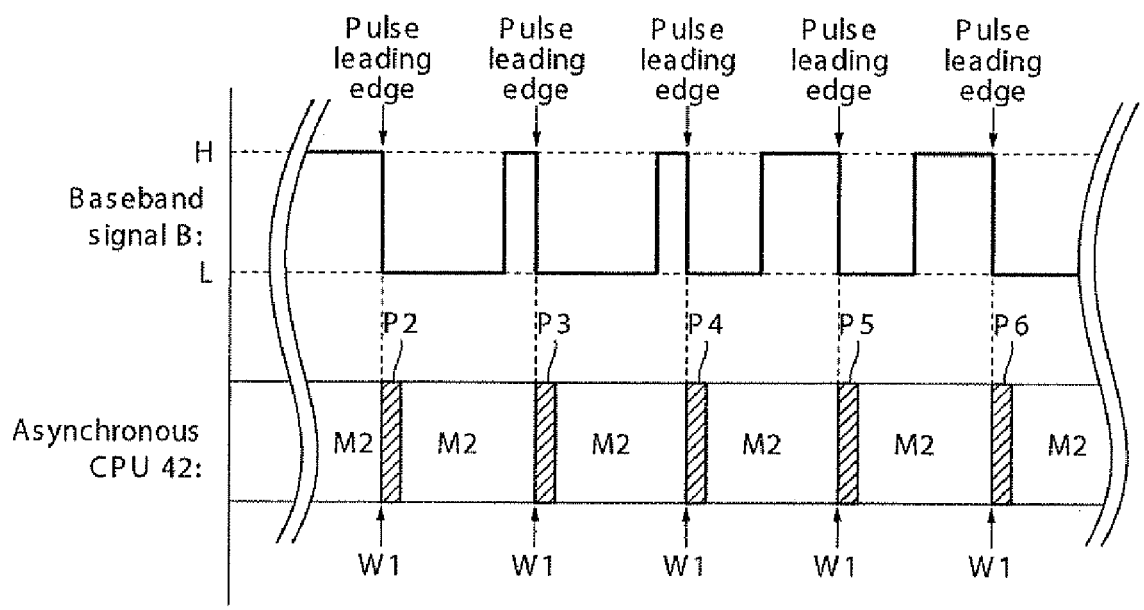
FIG. 9 is a diagram for explaining relationship between a baseband signal and the state of the asynchronous CPU.
Figure 10:
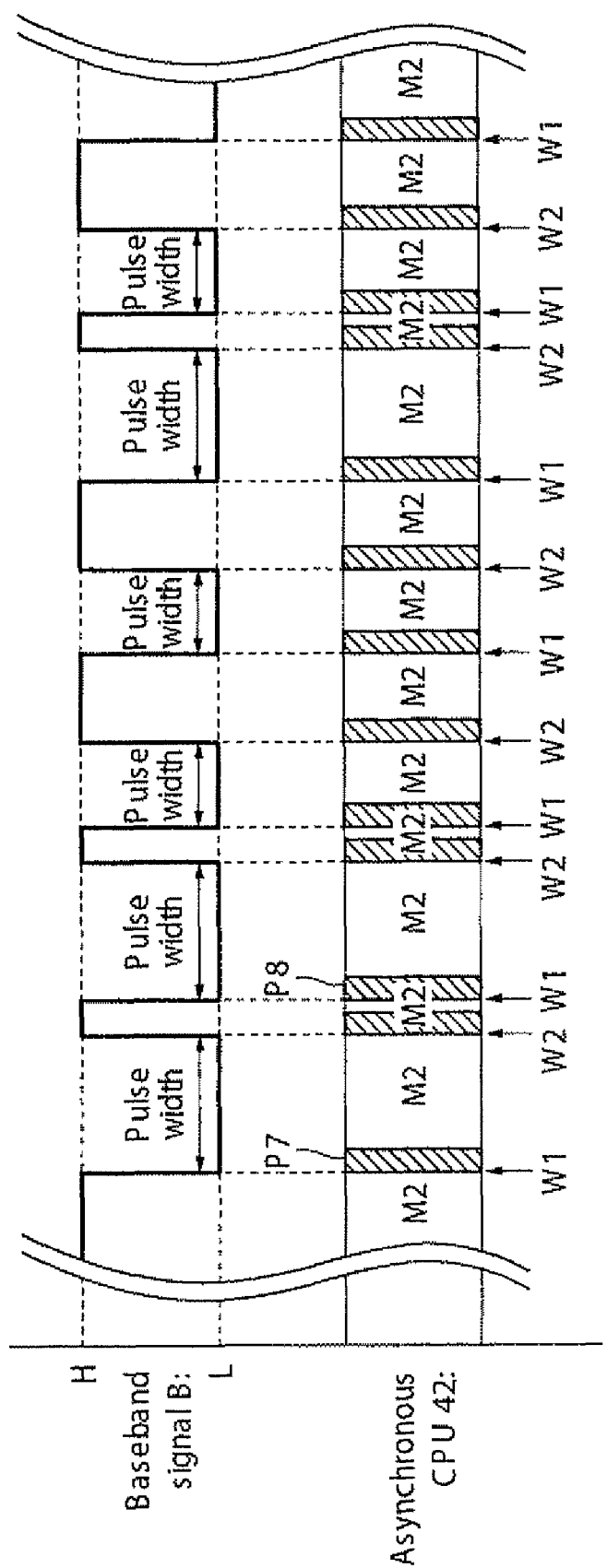
FIG. 10 is a diagram for explaining relationship between a baseband signal and the state of the asynchronous CPU.

Next, the flow charts shown in FIGS. 7 and 8 described above will be further described in detail, using concrete examples shown in FIGS. 9 and 10.

Concrete Example of Judgment Step

FIG. 9 is a diagram for describing relations between the baseband signal and the state of asynchronous CPU. FIG. 9 indicates "H" when the level of the signal is at high level, and "L" when the level of the signal is at low level. As shown in FIG. 9, while the asynchronous CPU 42 is in the standby state M2, when the baseband signal B changes from high level to low level, a fall interrupt signal W1 is inputted in the asynchronous CPU 42, and the asynchronous CPU 42 shifts to the exception process execution state M3 (P2). In P2, the synchronous CPU 42 in the exception process execution state M3 executes steps S201-S205 in the falling edge process S200 shown in FIG. 7.

In steps S201-S205, for example, a variable DPLL indicating the unchecked number is prepared in advance, and the variable DPLL is reduced (decremented) by one when the phase shift in a pulse included in the baseband signal is within the specified time range. More specifically, in step S201 shown in FIG. 7, the asynchronous CPU 42 judges, based on the variable DPLL, as to whether checking of the phase of the pulse included in the baseband signal B has been completed (for example, DPLL=0 ?). Also, variables Told and Tnew are prepared in advance, and in step S202, the asynchronous CPU 42 substitutes the value of the variable Tnew for the variable Told, and then substitutes the numerical value read from the counter 26 for Tnew. As a result, the numerical value of the counter 26 read at the leading edge of the immediately preceding pulse is stored at the variable Told, and the numerical value of the counter 26 read at the leading edge of the current pulse is stored at the variable Tnew. If the numerical value of the counter 26 measured at the leading edge of the immediately preceding pulse and the numerical value of the counter 26 read at the leading edge of the current pulse are the same or generally the same, in other words, a shift in phase at the leading edge of the current pulse is within the specified time range, the aforementioned jitter is assumed to be non-existing or small. Therefore, in step S203, the asynchronous CPU 42 calculates an absolute value of the difference between the variable Tnew and the variable Told, and judges as to whether or not the calculated absolute value is smaller than a variable dT indicating a threshold value (|Tnew−Told|<dT). In this case, in the initial setting in step S101 shown in FIG. 6, initial values are set at the variable DPLL, Told and Tnew (for example, "1," "0" and "0"), respectively.

Further, in the example described above, in step S204, the asynchronous CPU 42 decrements the variable DPLL (DPLL=DPLL−1). By this, phase checking of the pulse is set as completed. On the other hand, in step S205, the asynchronous CPU 42 resets the variable DPLL (for example, DPLL=1). By this, phase checking of the pulse included in the baseband signal B is set as uncompleted.

When the falling edge process S200 is completed, the asynchronous CPU 42 in the exception process execution state M3 shifts to the main process execution state M1, and the asynchronous CPU 42 in the main process execution state M1 restarts the main process S100 following the halt command in step S102. However, if it is judged in step S103 shown in FIG. 6 that the phase is in phase lock state, and until it is judged in step S104 that conversion of the entire pulses is completed, the asynchronous CPU 42 immediately executes the halt command in step S102 again. Therefore, as shown in FIG. 9, the asynchronous CPU 42 substantially shifts from P2 (the exception process execution state M3) to the standby state M2.

In this case, a flag Captured indicating the state of conversion of the entire pulses included in a unit length of the baseband signal B is prepared in advance, and in the initial setting in step S101 shown in FIG. 6, the asynchronous CPU 42 sets the flag Captured as being unconverted (for example, "0"). Also, in step S103, the asynchronous CPU 42 judges, based on the variable DPLL, as to whether the phase of the pulse included in the baseband signal B is in phase lock state or not (for example, DPLL=0?). Further, in step S104, the asynchronous CPU 42 judges, based on the flag Captured, as to whether the entire pulses included in the unit length of the baseband signal B have been converted to specified symbols or not (for example, Captured=1?).

Next, when the baseband signal B changes from low level to high level, a rising interrupt signal W2 is inputted in the asynchronous CPU 42 in the standby state M2, and the asynchronous CPU 42 shifts to the exception process execution state M3. The asynchronous CPU 42 in the exception process execution state M3 executes the rising edge process S300 shown in FIG. 8. However, until the leading edge of the pulse on which the conversion step is to be executed is set as having been detected in step S209 shown in FIG. 7, it is judged in step S301 that the leading edge of the pulse on which the conversion step is to be executed is undetected, and the asynchronous CPU 42 immediately ends the rising edge process S300. Therefore, as shown in FIG. 9, the asynchronous CPU 42 remains to be substantially in the standby state M2, even when the baseband signal B changes from low level to high level.

In this case, a flag Pon indicating the state of detection of the leading edge of the pulse on which the conversion step is to be executed is prepared in advance, and in the initial setting in step S101 shown in FIG. 6, an undetected flag (for example, "0") is set at the flag Pon.

Also, for example, when a numerical value of 2 or higher (for example, "5") is set as the initial value of the variable DPLL, and the process shifts to the exception process execution state M3 as the baseband signal B changes from high level to low level at P2, P3, P4, P5 and P6, it is possible to judge, for multiple consecutive pulses included in the baseband signal B, as to whether the phase shift in each of the pulses is within the specified time range. In other words, in step S204 shown in FIG. 7, the asynchronous CPU 42 decrements the variable DPLL (DPLL=DPLL−1). In this case, when DPLL becomes 0 (DPLL=0), the phase of the pulses included in the baseband signal B becomes to assume a phase lock state. On the other hand, in step S205, the asynchronous CPU 42 resets the variable DPLL (for example, DPLL=5). By this, with respect to the consecutive five pulses included in the baseband signal B, if the phase shift in any one of the pulses is not within the specified time range, the variable DPLL is reset in step S205.

With respect to the consecutive plural pulses included in the baseband signal B, when all of the phase shifts in the pulses are within the allowable time range, it is assumed that the reception state of the electromagnetic wave A is stable. Therefore, with respect to the consecutive plural pulses included in the baseband signal B, when all of the phase shifts in the pulses are judged in the judging step to be within the specified time range, the conversion step may preferably be executed.

Concrete Example of Conversion Step

FIG. 10 is a diagram for describing relations between the baseband signal and the state of asynchronous CPU. FIG. 10 indicates "H" when the level of the signal is at high level, and "L" when the level of the signal is at low level. As shown in FIG. 10, while the asynchronous CPU 42 is in the standby state M2, when the baseband signal B changes from high level to low level, a fall interrupt signal W1 is inputted in the asynchronous CPU 42, and the asynchronous CPU 42 shifts to the exception process execution state M3 (P7). In P7, the synchronous CPU 42 in the exception process execution state M3 executes steps S206-S209, upon judging that checking of the phases of the pulses included in the baseband signal B in step S201 shown in FIG. 7 has been completed.

In steps S206-S209, in the case of the example described above, in step S206, the asynchronous CPU 42 judges based on the flag Pon as to whether the leading edge of the pulse on which the conversion step is to be executed is undetected or not (for example, Pon=0?). Also, like steps S202 and S203 described above, in step S207, the asynchronous CPU 42 substitutes the value of the variable Tnew for the variable Told, and then substitutes the numerical value read from the counter 26 for Tnew. If the numerical value of the counter 26 read at the leading edge of the immediately preceding pulse and the numerical value of the counter 26 read at the leading edge of the current pulse are the same or generally the same, in other words, if the phase shift at the leading edge of the current pulse is within the specified time range, the numerical value of the counter 26 read at the leading edge of the current pulse can be considered to be the phase at the leading edge of the current pulse, such that the width of the current pulse can be calculated (detected) based on the phase at the leading edge of the pulse. Therefore, in step S208, the asynchronous CPU 42 calculates an absolute value of the difference between the variable Tnew and the variable Told, and judges as to whether the calculated absolute value is smaller than a variable dT indicating a threshold value (|Tnew−Told|<dT). Further, in step S209, the asynchronous CPU 42 sets the flag Pon as being detection-completed (for example, "1"). It is noted that, in step S209, the asynchronous CPU 42 may set the flag Pon as being detection-completed, restart the counter 26, and reset the numerical value at the counter 26 (for example, resets the counted numerical value to zero).

Next, when the baseband signal B changes from low level to high level, a rising interrupt signal W2 is inputted in the asynchronous CPU 42 in the standby state M2, and the asynchronous CPU 42 shifts to the exception process execution state M3 (P8). In P8, the asynchronous CPU 42 in the exception process execution state M3 executes steps S302-S316, upon judging in step S301 shown in FIG. 8 that detection of the leading edge of the pulse on which the conversion step is to be executed is completed.

In steps S302-S316, in the case of the example described above, like the step S202 described above, in step S302, the asynchronous CPU 42 substitutes the value of the variable Tnew for the variable Told, and then substitutes the numerical value read from the counter 26 for Tnew. As a result, the numerical value of the counter 26 read at the leading edge of the current pulse in step S207 is stored at the variable Told, and the numerical value of the counter 26 read at the rear edge of the current pulse is stored at the variable Tnew. By this, the pulse width of the current pulse can be calculated. In step S303, the asynchronous CPU 42 calculates an absolute value of the difference between the variable Tnew and the variable Told, and judges as to whether the calculated absolute value is within the specified numeral value range corresponding to the symbol "M." More specifically, when the numerical value of the counter 26 corresponding to 0.2 seconds is 30, the asynchronous CPU 42 judges as to whether the calculated absolute value is between 15 and 45 (15≦|Tnew−Told|≦45?).

Also, in the case of the example described above, a flag Tmark indicating a conversion state in which the immediately preceding pulse has been converted to the symbol "M" may be prepared in advance. In step S304, the asynchronous CPU 42 judges, based on the flag Tmark, as to whether the immediately preceding pulse has been converted to the symbol "M" (for example, Tmark=1?). Further, a variable Pointer indicating the pointer of an array is prepared in advance and, in step S305, the asynchronous CPU 42 sets the variable Pointer to the head (for example, Pointer=0), and sets the flag Tmark as unconverted (for example, "0"). On the other hand, in step S306, the asynchronous CPU 42 sets the flag Tmark as converted (for example, "1"). In this case, in the initial setting in step S101 shown in FIG. 6, the flag Tmark is set to unconverted (for example, "0"), and the variable Pointer is set to the head (for example, Pointer=0).

Also, in the case of the example described above, an array Buffer for the entire pulses, i.e., 60 pulses included in the unit length of the baseband signal b is prepared in advance and, in step S307, the asynchronous CPU 42 stores "M" in the array Buffer indicated by the variable Pointer (Buffer [Pointer]= "M") and, after storing, increments the variable Pointer (Pointer=Pointer+1). In this case, in the initial setting in step S101 shown in FIG. 6, the asynchronous CPU 42 clears the entire array Buffer (for example to zero).

Also, in the case of the example described above, in step S308, the asynchronous CPU 42 judges, based on the variable Pointer, as to whether the pointer of the array reaches the end. More specifically, when 0 through 59 are used as 60 pointers of the array Buffer, the asynchronous CPU 42 judges as to whether the variable Pointer is 60 or not (Pointer=60?). Further, in step S309, the asynchronous CPU 42 sets the variable Pointer to the head (for example, Pointer=0), and sets the flag Captured as converted (for example, "1").

Also, in the case of the example described above, like the step S303, the asynchronous CPU 42 calculates an absolute value of the difference between the variable Tnew and the variable Told in step S310, and judges as to whether the calculated absolute value is within the specified numerical value range corresponding to the symbol "1." More specifically, when the numerical value of the counter 26 corresponding to 0.5 seconds is 75, it is judged whether the calculated absolute value is between 60 and 90 (60≦|Tnew−Told|≦90?). Also, in step S311, the asynchronous CPU 42 stores "1" at the array Buffer indicated by the variable Pointer (Buffer [Pointer]="1") and, after storing, increments the variable Pointer (Pointer=Pointer+1). Further, in step S312, the asynchronous CPU 42 sets the flag Tmark as converted (for example, "0").

Also, in the case of the example described above, like the step S303, the asynchronous CPU 42 calculates an absolute value of the difference between the variable Tnew and the variable Told in step S313, and judges as to whether the calculated absolute value is within the specified numerical value range corresponding to the symbol "0." More specifically, when the numerical value of the counter 26 corresponding to 0.8 seconds is 120, it is judged as to whether the calculated absolute value is between 105 and 135 (105≦|Tnew−Told|≦135?). Also, in step S314, the asynchronous CPU 42 stores "0" at the array Buffer indicated by the variable Pointer (Buffer [Pointer]="0") and, after storing, increments the variable Pointer (Pointer=Pointer+1). On the other hand, in step S315, the asynchronous CPU 42 resets the variable DPLL (for example, DPLL=5).

Furthermore, in the case of the example described above, in step S316, the asynchronous CPU 42 sets the flag Pon as undetected (for example, "0").

Thereafter, for each of the pulses included in the baseband signal B, the asynchronous CPU 42 repeats processings similar to P7 and P8, until the flag Capture turns to converted (for example, "1").

For the baseband signal B in the unit length, after specified symbols corresponding to the first pulse through the 59$^{th}$ pulse are stored at the array Buffer, respectively, and when the specified symbol corresponding to the 60$^{th}$ pulse (the end) is stored in the array Buffer, the asynchronous CPU 42 in the standby state M2 shifts to the exception process execution state M3 when the baseband signal B changes from low level to high level. In the rising edge process S300 shown in FIG. 8, in step S309, the flag Captured turns to converted (for example, "1").

When the rising edge process S300 is completed, the asynchronous CPU 42 shifts to the main process execution state M1, and restarts the main process S100 following the halt command in step S102. In the main process S100 shown in FIG. 6, the variable DPLL becomes "0" in P6, it is judged in step S103 that the pulse is in phase lock state. Also, as the flag Captured turns to converted (for example, "1") as described above, it is judged in step S104 that the entire pulses have been converted. By this, the asynchronous CPU 42 can execute the time correction process in step S105. In the time correction process in step S105, the asynchronous CPU 42 reads the specified symbols stored in the entire array Buffer (for example, Buffer [0]–Buffer [59]) from the memory 50, decodes the readout specified symbols into information containing the time information, and outputs the decoded time information to the display device 70 to correct the time.

Concrete Example of Detection Step

When the receiver device 30 outputs the baseband signal B in the middle of the unit length, and pulses corresponding to the symbol "M" successively occur, the asynchronous CPU 42 in the standby state M2 shifts to the exception process execution state M3 as the baseband signal B changes from low level to high level. In the falling edge process S300 shown in FIG. 8, the variable Pointer is set to the head (for example, Pointer=0) in step S305, and specified symbols corresponding to pulses are stored again (overwritten) in the array Buffer from the first pulse (the head) in the baseband signal B in the unit length.

In accordance with the present embodiment, the asynchronous circuit 40 is structured with the edge detector 41, and the edge detector 41 outputs a fall interrupt signal W1 or a rise interrupt signal W2 to the asynchronous CPU 42 based on the baseband signal B inputted from the receiver device 30. However, the invention is not limited to such a structure. For example, the memory mapped I/O system may be used to allocate addresses corresponding to the receiver device 30 within a memory space of the memory 50. The asynchronous CPU 42 may read the addresses allocated to the receiver device 30 when the baseband signal B inputted from the receiver device 30 changes from high level to low level and from low level to high level, judge as to whether the baseband signal B changes from high level to low level, or changes from low level to high level, and accordingly execute the falling edge process S200 or the rising edge process S300.

In this manner, according to the time correction circuit 1 in accordance with the present embodiment, the asynchronous CPU 42 executes the specified process described above, at least one of when the baseband signal B changes from high level to low level and when the baseband signal B changes from low level to high level, and shifts to the standby state M2 after executing the specified process. As the baseband signal B outputted from the receiver device 30 is encoded by a pulse width modulation method (PWM encoded), the time information can be retrieved from the baseband signal B based on the pulse widths of pulses included in the baseband signal B. The pulse width can be obtained based on the time period measured by the timer 20 at a leading edge and at a rear edge of the pulse, in other words, when the baseband signal B changes from high level to low level and from low level to high level. Accordingly, at least one of when the baseband signal B changes from high level to low level and when it changes from low level to high level, in other words, in the exception process execution state M3, the asynchronous CPU 42 executes the specified process to retrieve time information from the baseband signal B based on the time period measured by the time 20, whereby the time information can be retrieved from the baseband signal B, and the time can be corrected based on the retrieved time information.

Also, the asynchronous CPU 42 is driven by an event in which the baseband signal B changes from high level to low level and by an event in which it changes from low level to high level, whereby the receiver device 30 and the asynchronous CPU 42 can be operated without synchronizing with each other. Furthermore, the asynchronous CPU 42 can calculate the pulse width from a difference between the times read out from the timer 20 when these two events occurred, whereby the timer 20 and the asynchronous CPU 42 can be operated without synchronizing with each other. Therefore, the timer 20, the receiver device 30 and the asynchronous CPU 42 can be operated without synchronizing with one another, in other words, can be asynchronously operated with one another, such that the time correction circuit 1 can be operated without requiring a global clock. Accordingly, an increased operation speed of the asynchronous CPU 42 would not affect the current consumption of circuits other than the asynchronous CPU 42, and the power consumption of circuits other than the asynchronous CPU 42 can be reduced, compared to the case where a global clock is used.

Furthermore, the asynchronous CPU 42, when placed in the standby state M2, would not flow dynamic currents other than leak currents, and has a small waiting time (latency) until another process becomes executable, and can quickly start up from the standby state M2. Therefore, at least one of when the baseband signal B changes from high level to low level and when it changes from low level to high level, the asynchronous CPU 42 in the standby state can quickly start up, in other words, can shift to the exception process execution state M3, and execute the specified process. Moreover, as the asynchronous CPU 42 shifts to the standby state M2 after executing the specified process, currents other than those flowing while executing the specified process can be reduced, the current consumption by the asynchronous CPU 42 can be reduced, and noise can be reduced as electromagnetic radiation is suppressed.

Also, according to the time correction circuit 1 in accordance with the present embodiment, the timer 20 has the 8-bit prescaler 21 that outputs a signal whose frequency is $1/2^m$ (m is an integer of 1 or more but 8 or less) of the frequency of the signal inputted from the oscillation circuit 10, and the 8-bit counter 26 that cyclically counts numerical values from zero to a set value based on the signal inputted from the 8-bit prescaler 21, wherein the asynchronous CPU 42 executes the specified process based on numerical values counted by the 8-bit counter 26. Here, the 8-bit prescaler 21 frequency-divides the specified frequency of the signal inputted from the oscillation circuit 10, i.e., $2^{15}$ Hz, to $1/2^m$, and the 8-bit counter 26 counts numerical values based on the signal that has been frequency-divided to $1/2^m$, such that the timer 20 can measure the time from $1/2^{14}$ or above but less than 2 seconds with a relatively simple circuit structure. By this, the power consumption by the timer 20 can be reduced.

Also, as the 8-bit counter 26 cyclically counts numerical values from zero to a set value, it becomes free-running after starting the counting. On the other hand, the asynchronous CPU 42 can calculate the pulse width from a difference between numerical values readout from the 8-bit counter 26 when the two events described above occur, such that the 8-bit counter 26 and the asynchronous CPU 42 can be operated without synchronizing with each other. Therefore, the 8-bit counter 26, the receiver device 30 and the asynchronous CPU 42 can be operated without mutual synchronization, in other words, can be operated asynchronously with one another, such that the time correction circuit 1 having such a structure as described above can also be operated without requiring a global clock.

Also, according to the time correction circuit 1 in accordance with the present embodiment, the two's complement number of a specified numerical value is set as the set value C at the 8-bit counter 26. Here, if a predetermined numerical value is set as is as the set value C at the 8-bit counter 26, and is counted up, a comparator would be required to judge as to whether the counted numerical value reaches the set value C, and to reset the counted value when counting in the state in which the set value C has been reached. In contrast, when the two's complement number of a predetermined numerical value is set as the set value C at the 8-bit counter 26 and counted up, the set value C can be reset by using a carry signal that is outputted from the 8-bit counter 26 when the specified numerical value is counted up, which makes a comparator unnecessary. Therefore, by setting the two's complement number of a predetermined numerical value as the set value C at the 8-bit counter 26, the power consumption that would have been required for a comparator can be reduced.

According to the time correction circuit 1 in accordance with the present embodiment, the specified process includes a conversion step of converting pulses included in the baseband signal B into specified symbols based on the time period measured by the timer 20. Accordingly, based on the times measured by the timer 20, the pulses included in the baseband signal B are converted to specified symbols, in other words, symbols composing time information (e.g., "M," "1" and "0"), such that the time information can be retrieved from the baseband signal B.

According to the time correction circuit 1 in accordance with the present embodiment, the conversion step includes a detection step of detecting a leading pulse among the entire pulses included in the unit length of the baseband signal B based on the converted specified symbols. It is noted that the baseband signal B is continuously outputted from the receiver device 30, so that the baseband signal B in a unit length (one record) needs to be separated (discriminated) at its boundary, in other words, between the last pulse in one preceding unit length and the leading pulse in the next unit length. Therefore, conventionally, the entire symbols converted from pulses included in a baseband signal in a unit length need to be stored for a plurality of records, and a boundary in the baseband signal B in a unit length is detected based on the stored symbols. In this case, the memory for storing the symbols needs a memory capacity capable of storing the entire symbols converted from the multiple records, for example, x×60 symbols (where x is an integer of 2 or more). In contrast, when pulses included in the baseband signal B are converted into specified symbols, and a boundary of the baseband signal B in a unit length is detected based on the converted specified symbols, the memory only requires a memory capacity for storing the symbols converted from the baseband signal B for one record, for example, only 60 symbols. Therefore, as the conversion step includes the detection step of detecting a leading pulse among the entire pulses included in a unit length of the baseband signal B based on the converted specified symbols, a boundary of the baseband signal B in a unit length can be detected, and the memory capacity of the memory 50 can be reduced. Therefore, the circuit cost and power consumption for the memory 50 can be reduced in proportion to the reduced amount in the memory capacity.

Also, according to the time correction circuit 1 in accordance with the present embodiment, the specified process includes, before the conversion step, a judging step of judging based on the time period measured as to whether a shift in phase of a pulse included in the baseband signal B is within a specified time range. It is noted that shifts in the time axis direction, in other words, jitter may be generated in the baseband signal B due to influence of noise or the like. Therefore, the periods and pulse widths of pulses included in the second baseband signal may have temporal shifts. In other words, it is possible that a phase shift may occur in at least one of the leading edge and the rear edge of a pulse included in the baseband signal B. In particular, as the phase of the leading edge of a pulse is used as a reference point for calculating (detecting) the pulse width of the pulse based on the time measured by the timer 20, a phase shift in the leading edge of a pulse has a great impact on the conversion step. Therefore, the specified process includes, before the conversion step, the judging step of judging, based on the time period measured, as to whether a phase shift in a pulse included in the baseband signal B is within a specified time range, whereby the conversion step can be executed after confirming that the phase shift in the pulse included in the baseband signal B is within the specified time range permissible in the conversion step, and therefore the accuracy in converting a pulse into a specified symbol in the conversion step can be improved.

Also, according to the time correction circuit 1 in accordance with the present embodiment, the conversion step is executed when it is judged in the judging step that phase shifts in a plurality of consecutive pulses are all within the specified time ranges. It is noted that, when a plurality of consecutive pulses included in the baseband signal B contain phase shifts that are all within the time ranges permissible in the conversion step, the state of electromagnetic wave reception is assumed to be stable. Therefore, by executing the conversion step, when it is judged by the judging step that phase shifts in a plurality of consecutive pulses included in the baseband signal B are all within the specified time ranges, the accuracy in converting pulses into specified symbols in the conversion step can be further improved.

Further, according to the time correction circuit 1 in accordance with the present embodiment, when all pulses included in the baseband signal B in a unit length are converted into specified symbols by the conversion step, the asynchronous CPU 42 executes the time correction process S105 of retrieving time information from the entire specified symbols converted and correcting the time based on the retrieved time information. By this, as all pulses included in the baseband signal B in a unit length have been converted into specified symbols by the conversion step described above, time information is retrieved from the entire specified symbols and the time is corrected. Therefore, if any one of the entire pulses included in the baseband signal B in a unit length cannot be converted into a specified symbol, the time is not corrected based on the baseband signal B. Accordingly, the reliability of the corrected time can be improved.

Second Embodiment

Figure 11:
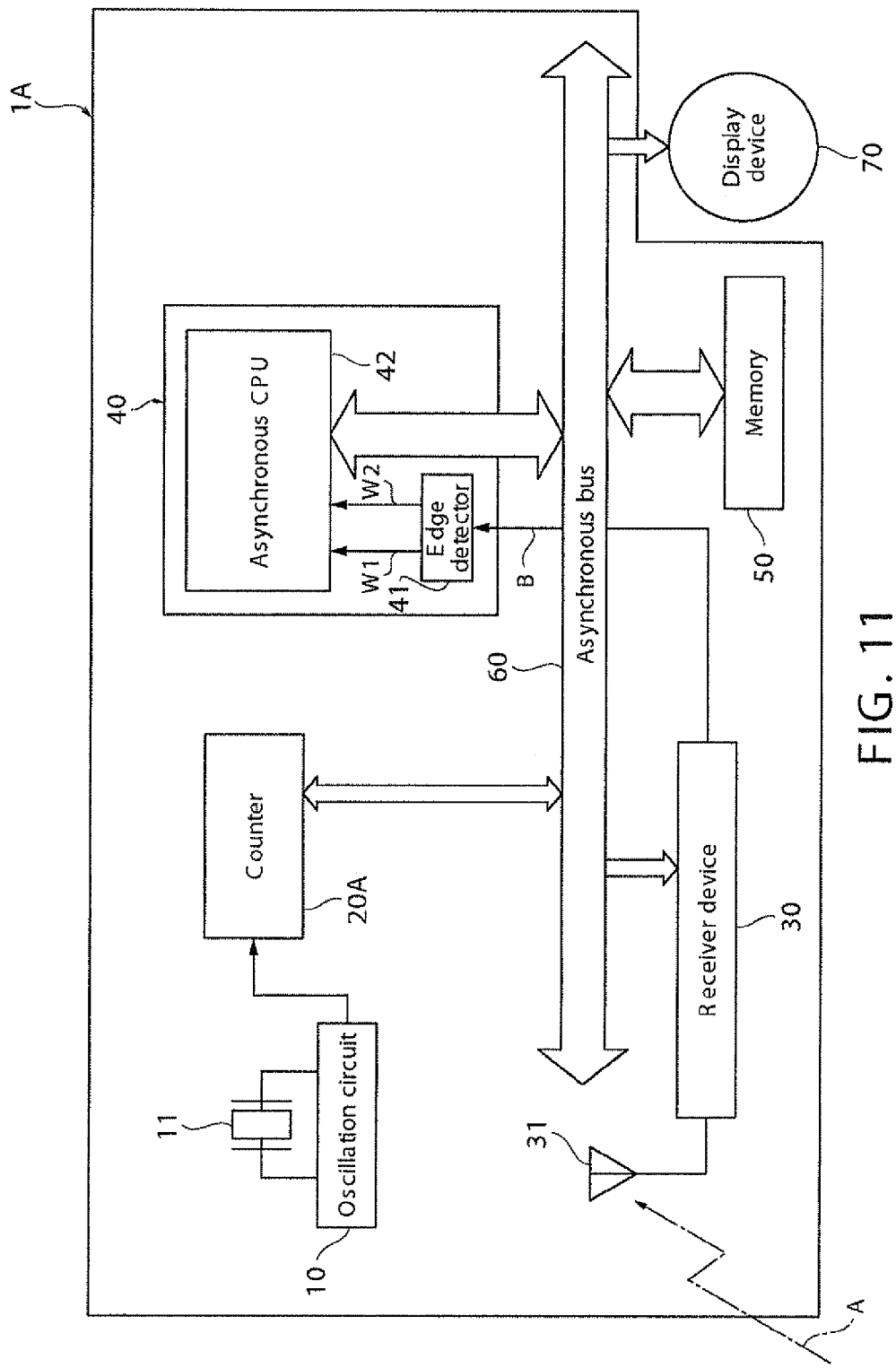
FIG. 11 is a block diagram of the structure of a time correction circuit in accordance with a second embodiment of the invention.

FIG. 11 shows a time correction circuit in accordance with a second embodiment of the invention, and is a block diagram of the time correction circuit in accordance with the present embodiment. It is noted that components shown in FIG. 11 that are the same as those of the first embodiment are appended with the same reference numerals unless stated otherwise, and description thereof will be omitted. Further, components not illustrated may be the same as those of the first embodiment described above.

As shown in FIG. 11, the time correction circuit 1A uses a counter of specified bits 20A instead of the timer 20 shown in FIG. 1. The counter of specified bits 20A cyclically counts numerical values from zero to a specified set value, based on a signal with a specified frequency f inputted from the oscillation circuit 10. The counter of specified bits 20A is structured to count up (measures) one count at each one cycle (one pulse) of the signal inputted from the oscillation circuit 10, and to be reset to zero upon counting in a state where the numerical value counted up from zero reaches the specified set value C. The specified set value C is a numerical value that has been pre-set through the asynchronous bus 60 by the asynchronous CPU 42. It is noted that, like the counter 26 of the first embodiment, the counter of specified bits 20A is not limited to the structure to count up but may be structured to count down.

As the set value C to be set at the counter of specified bits 20A, the two's complement number of a specified numerical value may preferably be set, like the counter 26 of the first embodiment. Here, if a predetermined numerical value is set as is as the set value C at the counter of specified bits 26, and counted up, a comparator would be required to judge whether the counted numerical value reaches the set value C, and to reset the counted value when counting in the state in which the set value C has been reached. In contrast, when the two's complement number of a specified numerical value is set as the set value C at the counter of specified bits 20A and counted up, the set value C can be reset by using a carry signal that is outputted from the counter of specified bits 20A when the specified numerical value is counted up, which makes a comparator unnecessary.

The asynchronous CPU 42 reads the numerical value of the counter of specified bits 20A through the asynchronous bus 60, thereby obtaining the time period measured by the counter of specified bits 20A. In other words, the asynchronous CPU 42 executes the specified processes described above based on the numerical values counted by the counter of specified bits 20A.

As the counter of specified bits 20A counts based on the signal with the specified frequency f, the times that are integer multiples of the frequency of the signal oscillated by the oscillation circuit 10 can be measured with a circuit with a relatively simple structure. Also, as the counter of specified bits 20A cyclically counts numerical values from zero to a set value, it becomes free-running after starting the counting. On the other hand, the asynchronous CPU 42 can calculate the pulse width from a difference between numerical values read-out from the counter of specified bits 20A when these two events occur, such that the counter of specified bits 20A and the asynchronous circuit 42 can be operated without synchronizing with each other. Therefore, the counter of specified bits 20A, the receiver device 30 and the asynchronous CPU 42 can be operated without mutual synchronization, in other words, can be operated asynchronously with one another, such that the time correction circuit 1 having such a structure as described above can be operated without requiring a global clock.

The number of bits of the counter of specified bits 20A is decided based on the specified frequency f of the single inputted from the oscillation circuit 10. More specifically, when the oscillation circuit 10 oscillates a signal at $2^n$ (n is a positive integer) Hz as the signal with the specified frequency f, the counter of specified bits 20A can measure the time up to the time for T seconds expressed by the following Formula (2).

$$T = C/2^n \quad (2)$$

In this case, the specified bits may preferably be (n+1) bits. The counter of (n+1) bits 20A is capable of setting an integer value of 1 or above but $2^{n+1}-1$ or less as the set value C. By this, like the first embodiment, according to the Formula (2), the (n+1)-bit counter 20A can measure the time T from $1/2^n$ or above up to less than $2^{n+1}/2^n$, in other words, less than 2 seconds ($1/2^n \leq T < 2$).

Also, when the oscillation circuit 10 oscillates a signal with a frequency of $2^{15}$ Hz, in other words, 32768 Hz, as the signal with the specified frequency f, the counter of specified bits 20A can measure the time up to the time for T seconds expressed the following Formula (3).

$$T = C/2^{15} \quad (3)$$

In this case, the specified bits may preferably be 16 bits. The 16-bit counter 20A is capable of setting an integer value of 1 or above but $2^{16}-1$ or less as the set value C. By this, like the first embodiment, according to the Formula (3), the 16-bit counter 20A can measure the time T from $1/2^{15}$ or above up to less than $2^{16}/2^{15}$, in other words, less than 2 seconds ($1/2^{15} \leq T < 2$).

In this manner, according to the time correction circuit 1A in accordance with the present embodiment, the time measurement device is the counter of specified bits 20A that cyclically counts numerical values from zero to the set value C based on the signal with the specified frequency f, and the asynchronous CPU 42 executes the specified processes based on the numerical values counted by the counter of specified bits 20A. Here, as the counter of specified bits 20A counts based on the signal with the specified frequency f, the times that are integer multiples of the frequency of the signal oscillated by the oscillation circuit 10 can be measured with a circuit with a relatively simple structure. Therefore, compared to the case where the time is measured by a time measurement device with a complex circuit structure, such as, a time watch, the power consumption by the time-measurement device can be reduced by the use of the counter of specified bits 20A.

Also, as the counter of specified bits 20A cyclically counts numerical values from zero to a set value, it becomes free-running after starting the counting. On the other hand, the asynchronous CPU 42 can calculate the pulse width from a difference between numerical values readout from the counter of specified bits 20A at the time of occurrence of these two events described above, such that the counter of specified bits 20A and the asynchronous circuit 42 can be operated without synchronizing with each other. Therefore, the counter of specified bits 20A, the receiver device 30 and the asynchronous CPU 42 can be operated without mutual synchronization, in other words, can be operated asynchronously with one another, such that the time correction circuit 1A having such a structure as described above can be operated without requiring a global clock.

According to the time correction circuit 1A in accordance with the present embodiment, the two's complement number of a predetermined numerical value is set as the set value C at the counter of specified bits 20A. Here, if a predetermined numerical value is set as is as the set value C in the counter of specified bits 20A, and counted up, a comparator would be required to judge whether the counted numerical value reaches the set value, and to reset the counted value when counting in the state in which the set value has been reached. In contrast, when the two's complement number of a predetermined numerical value is set as the set value in the counter of specified bits 20A and counted up, the set value C can be reset by using a carry signal that is outputted from the counter of specified bits 20A when the specified numerical value is counted up, which makes a comparator unnecessary. Therefore, by setting the two's complement number of a predetermined numerical value as the set value C at the counter of specified bits 20A, the power consumption that would have been required for a comparator can be reduced.

Also, according to the time correction circuit 1A in accordance with the present embodiment, the frequency of the signal oscillated by the oscillation circuit 10 may be $2^n$ Hz, and the time-measurement device is a (n+1)-bit counter 20A. Accordingly, the (n+1)-bit counter 20A can measure the time T from $1/2^n$ or above up to less than $2^{n+1}/2^n$, in other words, less than 2 seconds.

According to the time correction circuit 1A in accordance with the present embodiment, the frequency of the signal oscillated by the oscillation circuit 10 may be $2^{15}$ Hz, and the time-measurement device is a 16-bit counter 20A. Accordingly, the 16-bit counter 20A can measure the time T from $1/2^{15}$ or above up to less than $2^{16}/2^{15}$, in other words, less than 2 seconds.

Electronic Apparatus

Figure 12:
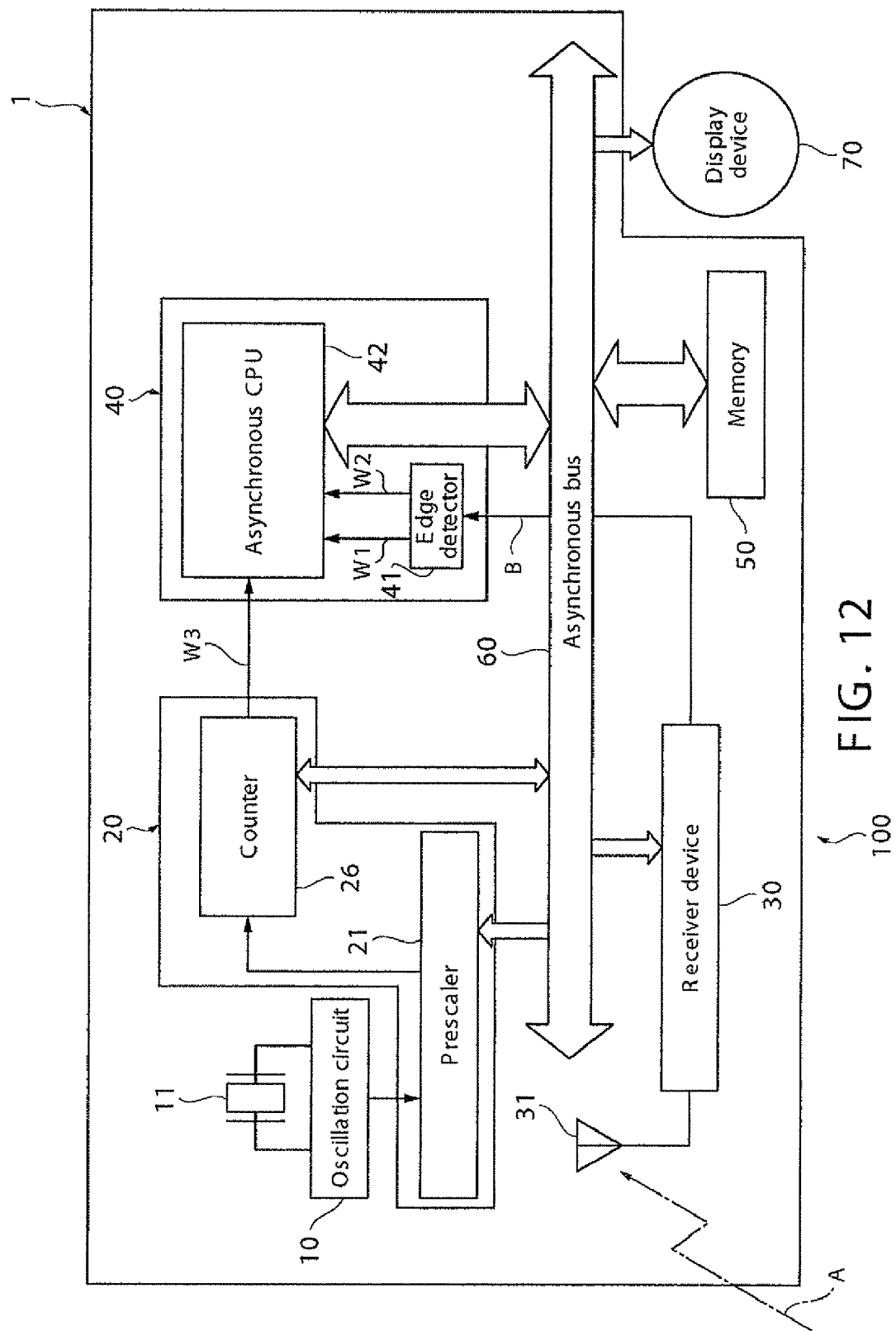
FIG. 12 is a block diagram for describing an example of an electronic apparatus in accordance with an embodiment of the invention.

Next, an electronic apparatus in accordance with an embodiment of the invention is described with reference to FIGS. 12 and 13. FIG. 12 is a block diagram of an example of the electronic apparatus in accordance with the present embodiment. It is noted that components shown in FIG. 12 that are the same as those of the time correction circuit in accordance with the first embodiment described above are appended with the same reference numerals unless stated otherwise, and description thereof will be omitted. Further, components not illustrated may be the same as those of the first embodiment described above.

As shown in FIG. 12, a timepiece 100 is equipped with a time correction circuit 1 in accordance with an embodiment of the invention and a display device 70. In the present embodiment, the timepiece 100 is described as being equipped with the time correction circuit 1 in accordance with the first embodiment, but may be equipped with the time correction circuit 1A in accordance with the second embodiment.

As shown in FIG. 9 and FIG. 10, the asynchronous CPU 42 is in halt with respect to the baseband signal B, in other words, in the standby state M2, for a long time, such that operations other than time correction, for example, a timing process S400 may be performed.

Like the time correction circuit 1 of the first embodiment, when the oscillation circuit 10 oscillates a pulse signal with a frequency of $2^{15}$ Hz, in other words, 32768 Hz, as the signal with the specified frequency f, the timer 20 uses an 8-bit prescaler 21 and an 8-bit counter 26. In this case, the timer 20 can measure the time up to T seconds, expressed by Formula (1) described above. Therefore, by setting "$2^8$" as the division ratio m, and "128" as the set value C, the timer 20 can measure the time T from $1/2^{15}$ seconds or above up to $2^8 \times 2^7/2^{15}$ seconds or less, in other words, 1 second or less ($1/2^{15} \leq T \leq 1$).

The counter 26 outputs a timing interrupt signal W3 to the asynchronous CPU 42, upon reaching the set value C, i.e., "128." By this, the timer 20 can output timing interrupt signals W3 at one second period, whereby the asynchronous CPU 42 can execute the timing process S400 that times at each one second, without using an additional circuit.

When the two's complement number of "128" is set as the set value C at the counter 26, an overflow (a carry signal) generated by the counter 26 can serve as the timing interrupt signal W3.

Figure 13:
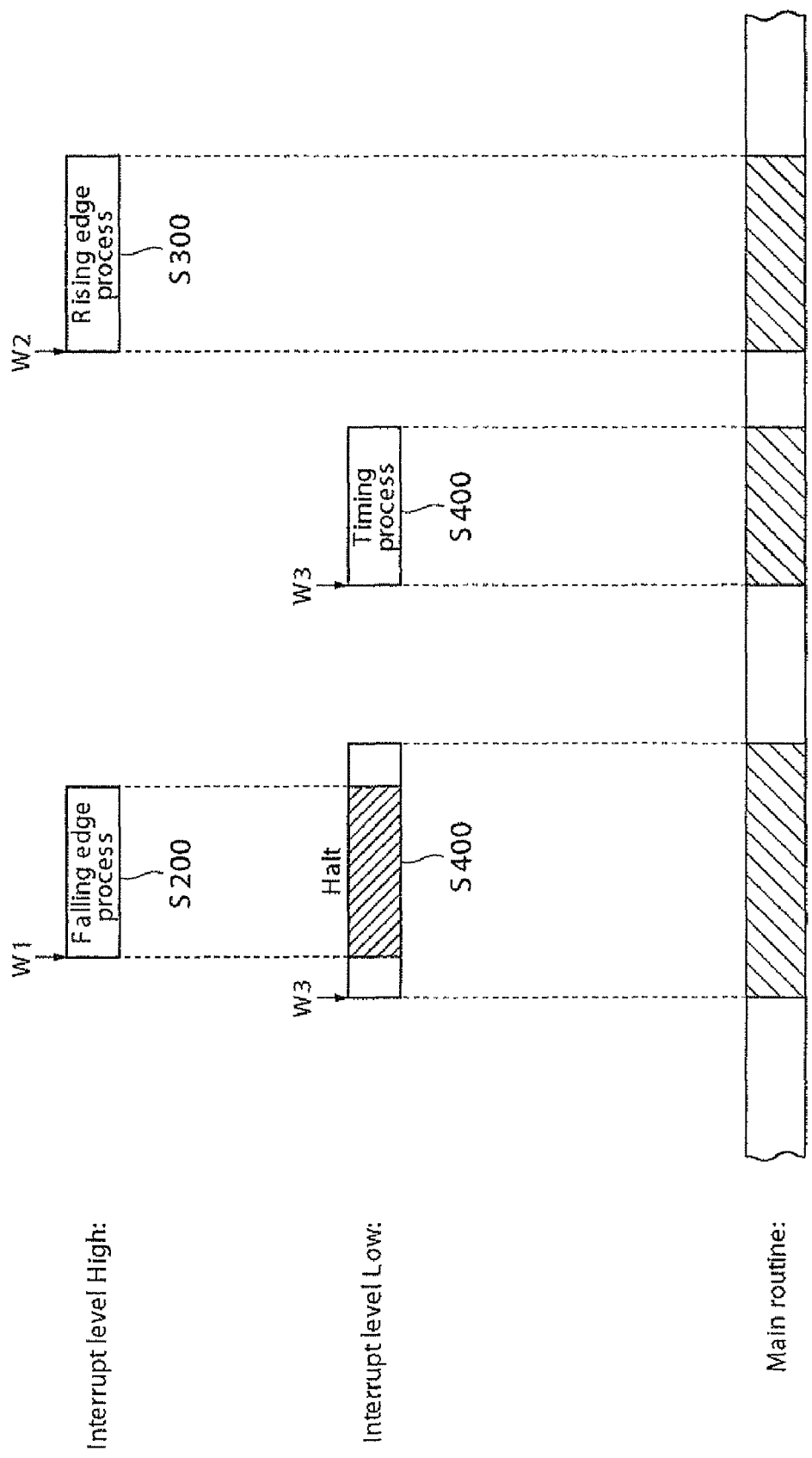
FIG. 13 is a diagram for explaining interrupt levels of interrupt signals to be inputted in the asynchronous CPU shown in FIG. 12.

FIG. 13 is a diagram for describing interrupt levels of the interrupt signals inputted in the asynchronous CPU. FIG. 13 shows the processing in steps S101-S105 in the main process S100 as the "main routine." The timing operation by the timepiece 100 is performed according to the main routine and the timing process S400. As shown in FIG. 13, when a timing interrupt signal W3 is inputted while the main routine is being executed, the asynchronous CPU 42 starts the timing process S400. The interrupt level of the timing interrupt signal W3 is set lower than the levels of the fall interrupt signal W1 and the rise interrupt signal W2. In other words, when an interrupt signal at a higher level, for example, the fall interrupt signal W1 is inputted while the timing process S400 is being executed, the asynchronous CPU 42 stops the timing process S400, and starts the falling edge process S200. Then, after completing the falling edge process S200, the asynchronous CPU 42 re-starts the timing process S400, and executes the main routine after completing the timing process S400. Also, when an interrupt signal at a higher level, for example, the rise interrupt signal W2 is inputted while the main routine is being executed, the asynchronous CPU 42 starts the rising edge process S300. Then, after completing the rising edge process S300, the asynchronous CPU 42 executes the main routine.

In accordance with the present embodiment, the timer 20 of the time correction circuit 1 outputs the timing interrupt signal W3. However, without being limited to the above, as long as the timing interrupt signal W3 is outputted at one second cycle to the asynchronous CPU 42, for example, a timer other than the timer 20 of the time correction circuit 1 may be provided, and the timer may be structured to output the timing interrupt signal W3 at one second cycle.

Also, the time correction circuit 1 or 1A in accordance with the embodiment of the invention is also applicable to other electronic apparatuses, such as, for example, desktop display devices, portable display devices, and other various types of sensing devices, in addition to the timepiece 100.

In this manner, the timepiece 100 in accordance with the present embodiment is equipped with the time correction circuit 1 in accordance with any one of the embodiments of the invention described above, such that the power consumption can be reduced, and noise can be reduced by suppressing electromagnetic radiation, compared to electronic apparatuses in related art. Accordingly, it is possible to realize electronic apparatuses that can be operated for long hours due to the reduced power consumption, and are highly reliable due to the reduced noise.

It is noted that the compositions of the embodiments described above may be combined, or parts of the components may be interchanged with one another. Also, the compositions of the invention are not limited to those of the embodiments described above, and various changes can be made in the range that does not depart from the subject matter of the invention.

What is claimed is:

1. A time correction circuit comprising:
   a time-measurement device that measures a time period;
   a receiver device that receives an electromagnetic wave based on a first baseband signal, the first baseband signal including time information concerning time and being encoded by a pulse width modulation method, the receiver device outputting a second baseband signal based on the electromagnetic wave; and
   an asynchronous circuit that corrects the time based on the second baseband signal,
   wherein the asynchronous circuit executes a specified process to retrieve the time information from the second baseband signal based on the time period measured at least one of when the second baseband signal changes from high level to low level and when the second baseband signal changes from low level to high level, and shifts to a standby state after executing the specified process.

2. A time correction circuit according to claim 1, further comprising an oscillation circuit that oscillates with a signal with a specified frequency, and that outputs a signal, wherein the time-measurement device includes a counter of specified bits that cyclically counts numerical values from zero to a set value based on the signal with the specified frequency, and the asynchronous circuit executes the specified process based on the numerical values counted by the counter of specified bits.

3. A time correction circuit according to claim 2, wherein a two's complement number of a predetermined numerical value is set as the set value in the counter of specified bits.

4. A time correction circuit according to claim 2, wherein the specified frequency is $2^n$ (n is a positive integer) Hz, and the specified bits are (n+1) bits.

5. A time correction circuit according to claim 2, wherein the specified frequency is $2^{15}$ Hz, and the specified bits are 16 bits.

6. A time correction circuit according to claim 5, wherein the time-measurement device includes an 8-bit prescaler that outputs a signal whose frequency is $1/2^m$ (m is an integer of 1 or more but 8 or less) of the frequency of the signal inputted from the oscillation circuit, and an 8-bit counter that cyclically counts numerical values from zero to a set value based on the signal inputted from the 8-bit prescaler, wherein the asynchronous circuit executes the specified process based on numerical values counted by the 8-bit counter.

7. A time correction circuit according to claim 6, wherein a two's complement number of a specified numerical value is set as the set value at the 8-bit counter.

8. A time correction circuit according to claim 1, wherein the specified process includes a conversion step of converting a pulse included in the second baseband signal into a specified symbol based on the time period measured by the time-measurement device.

9. A time correction circuit according to claim 8, wherein the conversion step includes a detection step of detecting a leading pulse among the entire pulses included in a unit length of the second baseband signal based on the specified symbol converted.

10. A time correction circuit according to claim 8, wherein the specified process includes, before the conversion step, a judging step of judging based on the time period measured as to whether a shift in phase of a pulse is within a specified time range.

11. A time correction circuit according to claim 10, wherein the conversion step is executed when the judging step judges that phase shifts in a plurality of consecutive pulses are within specified time ranges, respectively.

12. A time correction circuit according to claim 8, wherein, when all the pulses included in the second baseband signal in a unit length are converted into specified symbols by the conversion step, the asynchronous circuit executes a time correction process of retrieving time information from the entire specified symbols converted and correcting the time based on the time information retrieved.

13. An electronic apparatus comprising the time correction circuit recited in claim 1.

14. A time correction circuit comprising:
   a time measurement device that measures a time period;
   a receiver device that receives an electromagnetic wave based on a first baseband signal, the first baseband signal including time information, the first baseband signal being encoded by a pulse width modulation method, the receiver device outputting a second baseband signal based on the electromagnetic wave; and
   an asynchronous circuit that corrects a time based on the second baseband signal.

15. The time correction circuit according to claim 14, the asynchronous circuit decoding the second baseband signal to the time information.

16. The time correction circuit according to claim 14, further comprising an oscillating circuit that outputs a signal,
   the time measurement device including a counter, the counter counting numerical values from zero to a set value based on the signal,
   the asynchronous circuit operates based on the numerical values.

* * * * *